(12) United States Patent
Siddiqi et al.

(10) Patent No.: US 11,831,491 B2
(45) Date of Patent: *Nov. 28, 2023

(54) SYSTEM AND METHODS TO VALIDATE ISSUE DETECTION AND CLASSIFICATION IN A NETWORK ASSURANCE SYSTEM

(71) Applicant: Cisco Technology, Inc., San Jose, CA (US)

(72) Inventors: Waseem A Siddiqi, Campbell, CA (US); Rajesh S. Pazhyannur, Fremont, CA (US); Kedar Krishnanand Gaonkar, San Jose, CA (US); Aruna Nukala, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 54 days.

This patent is subject to a terminal disclaimer.

(21) Appl. No.: 17/488,268

(22) Filed: Sep. 28, 2021

(65) Prior Publication Data

US 2022/0021574 A1    Jan. 20, 2022

Related U.S. Application Data

(63) Continuation of application No. 16/393,162, filed on Apr. 24, 2019, now Pat. No. 11,153,152.

(Continued)

(51) Int. Cl.
*H04L 41/0677* (2022.01)
*H04L 41/22* (2022.01)
(Continued)

(52) U.S. Cl.
CPC ........ *H04L 41/0677* (2013.01); *H04L 41/145* (2013.01); *H04L 41/22* (2013.01); *H04W 84/12* (2013.01)

(58) Field of Classification Search
CPC ... H04L 41/0677; H04L 41/145; H04L 41/22; H04L 41/06; H04W 84/12; H04W 24/04
See application file for complete search history.

(56) References Cited

U.S. PATENT DOCUMENTS

| 7,707,470 B2 | 4/2010 | Doris et al. |
| 8,756,178 B1 | 6/2014 | Bruckhaus et al. |

(Continued)

FOREIGN PATENT DOCUMENTS

CN    104598367 B    12/2017

OTHER PUBLICATIONS

Zhu, Zhaosheng, et al., "Using Failure Information Analysis to Detect Enterprise Zombies," Jul. 17, 2009, available at csl.sri.com, page accessed on Dec. 21, 2018, 20 pages.

*Primary Examiner* — Ivan O Latorre
(74) *Attorney, Agent, or Firm* — Polsinelli

(57) ABSTRACT

Systems, methods and computer-readable storage media are provided for detecting and simulating issues in a network. The methodology includes identifying: event sequences within network traffic data; filtering out a subset of the event sequences based on characteristics of the subset of the event sequences; generating definition groups by performing clustering on the subset of the event sequences, the definition groups comprising event sequence characteristics associated with one or more network issues; first simulating the subset of the event sequences; generating, based on results of the first simulating, a first issue identification; second simulating a most recent one of the identified event sequences; generating, based on results of the second simulating and the generated definition groups, a second issue identification; and validating the first issue identification with the second issue identification.

20 Claims, 20 Drawing Sheets

Related U.S. Application Data

(60) Provisional application No. 62/770,279, filed on Nov. 21, 2018.

(51) Int. Cl.
*H04L 41/14* (2022.01)
*H04W 84/12* (2009.01)

(56) References Cited

U.S. PATENT DOCUMENTS

| | | |
|---|---|---|
| 8,909,926 B2 | 12/2014 | Brandt et al. |
| 9,652,316 B2 | 5/2017 | Gamage et al. |
| 2005/0177353 A1 | 8/2005 | Slater |
| 2006/0026276 A1 | 2/2006 | Kroger et al. |
| 2006/0126608 A1 | 6/2006 | Pereira et al. |
| 2007/0093986 A1* | 4/2007 | Armstead ............. G06F 11/349 702/182 |
| 2009/0319249 A1 | 12/2009 | White et al. |
| 2011/0145026 A1 | 6/2011 | Singh et al. |
| 2011/0173146 A1* | 7/2011 | Hnatio ................... G06Q 10/06 706/14 |
| 2012/0311387 A1* | 12/2012 | Santhosh ............ G06F 11/3433 714/33 |
| 2013/0145213 A1 | 6/2013 | Tang et al. |
| 2013/0282334 A1 | 10/2013 | Diperna et al. |
| 2014/0114644 A1 | 4/2014 | Smith et al. |
| 2016/0373963 A1* | 12/2016 | Chechani ........... H04B 7/18504 |
| 2018/0019910 A1* | 1/2018 | Tsagkaris ................ H04B 7/04 |
| 2019/0163552 A1* | 5/2019 | Xu ....................... G06F 11/0751 |
| 2019/0165991 A1* | 5/2019 | Cheng ................ H04L 43/0817 |
| 2019/0372908 A1 | 12/2019 | Featonby et al. |
| 2020/0110627 A1* | 4/2020 | Chou ..................... H04L 41/12 |

\* cited by examiner

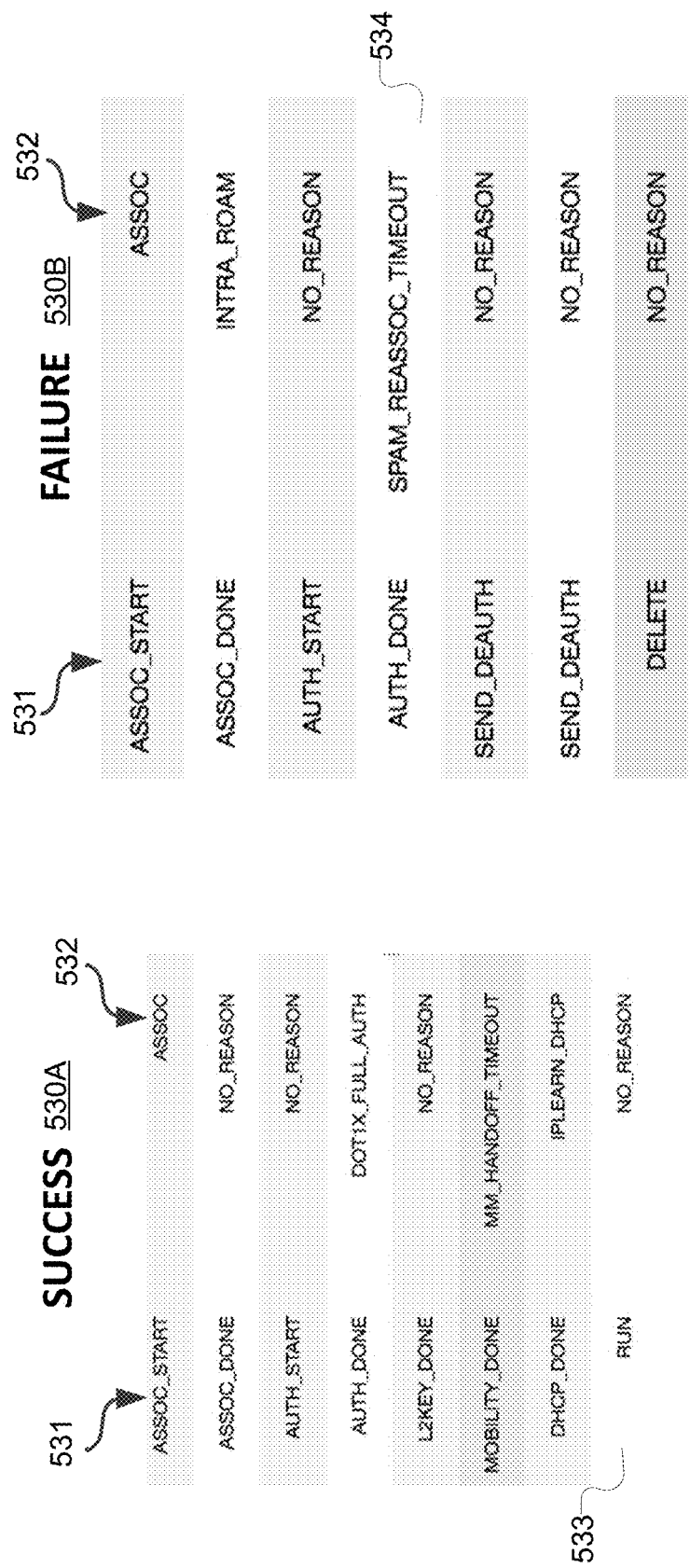

| | transaction pattern 556 | frequency (%) 557 |
|---|---|---|
| 551a | 1,2,3,1,2,3,4,5,9, | 17.82 |
| 551b | 1,2,3,4,5,6,7,9, | 12.53 |
| 551c | 1,2,3,4,5,9, | 8.02 |
| 551d | 1,2,3,3,4,5,9, | 5.78 |
| 551e | 1,2,3,1,2,3,4,5,6,7,9, | 4.06 |
| 551f | 1,2,3,4,5,6,1,2,3,4,5,7,9, | 3.65 |
| 551g | 1,2,3,1,2,3,1,2,3,4,5,9, | 2.76 |
| 551h | 1,2,3,3,3,4,5,9, | 2.65 |
| 551i | 1,2,3,12,3,4,5,6,7,9, | 2.46 |
| 551j | 1,2,3,12,3,4,5,9, | 2.27 |
| 551k | 1,2,3,4,5,6,7,1,2,3,4,5,9, | 2.24 |
| 551l | 1,2,3,3,1,2,3,4,5,9, | 2.16 |
| 551m | 1,2,3,3,3,3,4,5,9, | 1.98 |
| 551n | 1,2,3,1,2,5,9, | 1.83 |
| 551o | 1,2,3,1,2,3,1,2,3,4,5,9, | 1.49 |

SYSTEM AND METHODS TO VALIDATE ISSUE DETECTION AND CLASSIFICATION IN A NETWORK ASSURANCE SYSTEM

CROSS-REFERENCE TO RELATED APPLICATIONS

This application is a continuation of U.S. patent application Ser. No. 16/393,162, filed Apr. 24, 2019, entitled "SYSTEMS AND METHODS TO VALIDATE ISSUE DETECTION AND CLASSIFICATION IN A NETWORK ASSURANCE SYSTEM," which is related to and claims priority under 35 U.S.C. § 119(e) from U.S. Patent Application No. 62/770,279, filed Nov. 21, 2018, entitled "SYSTEMS AND METHODS TO VALIDATE ISSUE DETECTION AND CLASSIFICATION IN A NETWORK ASSURANCE SYSTEM," the entire contents of each of which is incorporated herein by reference for all purposes.

TECHNICAL FIELD

The subject matter of this disclosure relates in general to the field of computer networking, and more particularly, to systems and methods for improving the operation of an enterprise network.

BACKGROUND

A campus network can provide connectivity to computing devices (e.g., servers, workstations, desktop computers, laptop computers, tablets, mobile phones, etc.) and things (e.g., desk phones, security cameras, lighting, heating, ventilating, and air-conditioning (HVAC), windows, doors, locks, medical devices, industrial and manufacturing equipment, etc.) within environments such as offices, hospitals, colleges and universities, oil and gas facilities, factories, and similar locations. Some of the unique challenges a campus network may face include integrating wired and wireless devices, on-boarding computing devices and things that can appear anywhere in the network and maintaining connectivity when the devices and things migrate from location to location within the network, supporting bring your own device (BYOD) capabilities, connecting and powering Internet-of-Things (IoT) devices, and securing the network despite the vulnerabilities associated with Wi-Fi access, device mobility, BYOD, and IoT.

Current approaches for deploying a network capable of providing these functions often require constant and extensive configuration and administration by highly skilled network engineers operating several different systems (e.g., directory-based identity services; authentication, authorization, and accounting (AAA) services, wireless local area network (WLAN) controllers; command line interfaces for each switch, router, or other network device of the network; etc.) and manually stitching these systems together. This can make network deployment difficult and time-consuming, and impede the ability of many organizations to innovate rapidly and adopt new technologies, such as video, collaboration, and connected workspaces.

BRIEF DESCRIPTION OF THE FIGURES

To provide a more complete understanding of the present disclosure and features and advantages thereof, reference is made to the following description, taken in conjunction with the accompanying drawings, in which:

FIGS. 3A-3I illustrate examples of graphical user interfaces for a network management system in accordance with some examples;

FIGS. 5Ci-5Cii illustrate transaction event sequences in accordance with some examples;

FIG. 5F illustrates a frequency table for excess transaction event patterns in accordance with some examples;

DESCRIPTION OF EXAMPLE EMBODIMENTS

Figure 1:
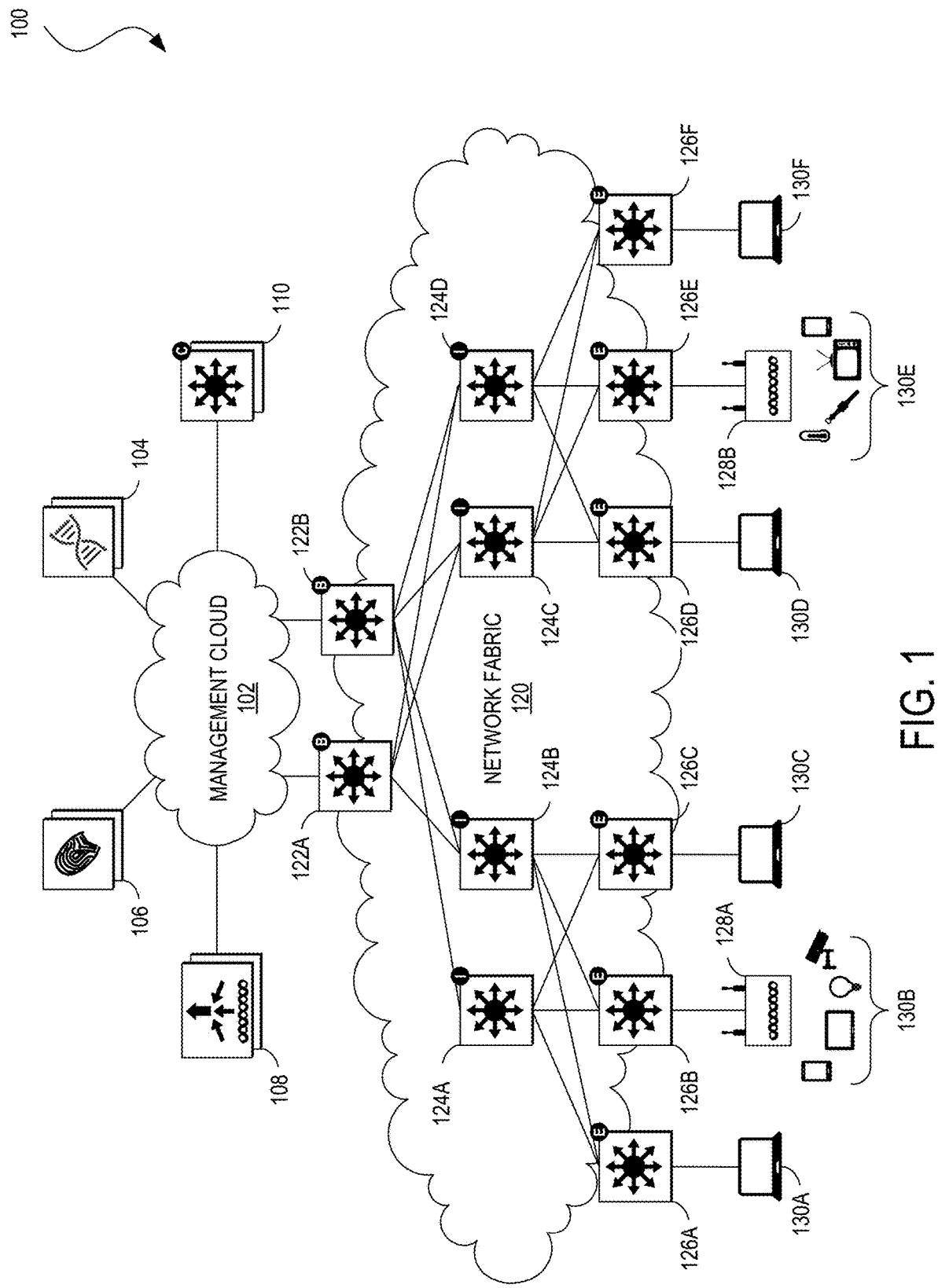
FIG. 1 illustrates an example of a physical topology of an enterprise network in accordance with some examples.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Systems, methods and computer-readable storage media for issue validation by performing issue simulation and reproduction for detected issues are described. In some cases, a data collection service captures data models of raw streaming telemetry data from network devices as it is passed to a network management and assurance service. The telemetry data can include client event data such as access statistics, packet captures, device key performance indicators (KPIs), service KPIs, and the like. Sequences of client events are observed and recorded in order to generate a simplified definition of issues defined in terms of event patterns and associated with, for example and without imputing limitation, failure, roaming, and normal onboarding patterns. Using the simplified definitions, issues can be simulated by an issue simulation engine to validate issues detected by the network management and assurance service. In addition, the simplified definitions can be processed by a machine learning engine to perform clustering and issue prediction in order to increase the accuracy and speed of issue identification.

In at least some aspects, an example system, method, or computer-readable storage medium can receive network traffic data, identify event sequences within the network traffic data, generate definition groups by performing clustering on the identified event sequences, the definition groups including event sequence characteristics associated with one or more network issues, provide one or more of the event sequences to an issue simulation engine to simulate the one or more event sequences and generating a first issue identification by an assurance platform, generate a second issue identification based on the definition groups and the one or more of the event sequences; and validate the first issue identification with the second issue identification.

EXAMPLE EMBODIMENTS

Network assurance platforms may be a single point in a network management system where network issues may be detected, classified, and displayed to a customer. However, there is often no way to verify that all issues have been detected by the assurance platform or that the detected issues are being properly classified.

An external (to the assurance platform) and independent source of truth can verify and validate issue spotting by the assurance platform. In some cases, raw telemetry data from a Wireless Local Area Network Controller (WLC), packet captures, or Technical Assurance Centers (TAC)/manual assurance can provide verification and validation of the assurance platform. However, these solutions may fail to handle many kinds of client behavior or may not be unable to handle issues that are outside the design parameters of a particular solution (e.g., it may lack the ability to identify issues that occur in customer sites but have not been well defined and integrated into a respective detection system).

In other words, a system is needed for independent issue detection and classification, cataloging issues in order to check whether an issue is new or already defined, and automated reproduction of issues for an assurance system to validate whether the issue was detected and classified correctly (e.g., providing reproducibility). An example of a system for detecting and classifying issues, cataloging issues, and reproducing and/or validating issues, can include five high level steps. These steps may include collecting data, identifying event patterns for issue identification, simulating issues, executing an assurance platform on the simulated issues, and validating results from the assurance platform.

Data Collection

Network devices may export client streaming telemetry data to an assurance and/or analytics engine. The network devices can include, for example and without imputing limitation, Wireless LAN controllers (WLC) and/or Access Points (AP). Data models of the raw streaming telemetry data from WLCs and APs may be attached to the streaming telemetry data. The data models can include, for example, wireless client state, client and AP radio frequency (RF) statistics, over air packet captures, network services KPIs, device health KPIs, etc. for the purposes of this disclosure, these are called client events.

Issue Identification and Definition Engine

Client events, such as those sent by the WLC and AP, can be identified according to various sequences and patterns. The client events may be based off real client behavior. The sequences can form a specific pattern that may indicate and/or define issues with specific focus on failure, roaming, and normal onboarding patterns. Variations may include, for example and without imputing limitation, changes in SSID, radios, and APs, timing differences between client events, retries of the client events, and reason codes, etc.

As a result, a simplified definition of issues may be created which can be catalogued and used to replay events to generate issues by an assurance and/or analytics platform. In order to identify and define issues, the following steps can be undergone:

(a) collect WLC and AP client event data;
(b) analyze all data in order to extract patterns of onboarding sequences;
(c) tag the sequences with category identifiers;
(d) represent each of the sequences with client events in a single line model; and
(e) simplify the single line model by a cluster mechanism to identify the repetitive components.

A learning engine using the above data identifies new issues and clusters. The learning engine may use semi-supervised learning. For example, a first round of unsupervised clustering may be performed and then a second round of human/expert clustering may be performed to create a catalog of issues.

The learning engine can catalog and cluster issues in the form of a meta-language. For example, when wireless clients run into onboarding failures, a simple representation of the onboarding failure issue could be in the form of: {timestamp, event-type, result-type, reason-code, packet-capture}. The meta-language form of the onboarding failure issue can then be leveraged by a test generator to generate synthetic tests (discussed below).

Issue Simulation

The issued identified above can be reproduced by the WLC, AP, or a simulation service. The recreated real world client scenarios may then be used to generate issue identifications (e.g., by the network assurance and/or analytics platform) for verification, experimentation, and the like.

The simulation service can automatically generate synthetic tests from the issue catalogue using a meta-language. The synthetic tests can be provided to the WLCs and/or Aps or, in some examples, respective simulations in order to verify whether the issue is detected and classified accurately (e.g., by an assurance platform, probabilistic classifier, etc.). Further, the data collected by the learning engine from different sources at different time windows may help to generate synthetic tests that can be executed at different network devices.

Continuing with the example of onboarding failures of wireless clients, the test generator can generate a sequence of events based on the {timestamp, event-type, result-type, reason-code, packet-capture} meta-data captured in the issue catalog and feed it into the WLCs and/or the APs to trigger issue detection in the assurance and/or analytics platform. This may help in verifying if issues are being correctly identified and categorized.

Assurance and Analytics Platform Issue Generation

The assurance and analytics platform may receive incoming data and trigger an issue when conditions are satisfied according to its own rules and definitions. For example, an unmodified assurance and analytics platform may receive incoming data produced by the simulation service and generate issue detections and solution options as if the data were real world events being produced by WLCs and APs without direction of a simulation engine.

Issue Validation

As issues are generated by the assurance and/or analytics platform, the generated issues can be confirmed by the issue identification engine when conditions are satisfied.

In comparison, in typical cases not using the above approach, issue validation is often based on an expert determining what issues to test and then using a synthetic test to validate the system by unit or regression testing. Instead, the above approach can learn of issues (e.g., failure patterns) independently and based on customer data. The learned issues can then be used to drive validation and/or updating of the assurance and/or analytics platform. Additionally, characterizing issues characterized in a meta-data form enables cataloging and curating issues and respective underlying event sequence information (e.g., for later reproduction, analysis, experiment, etc.).

For example, patterns can be processed to identify an "excessive transaction." As discussed in this disclosure, an excessive transaction is a transaction in which a client joins a wireless network in an unreasonable amount of time. A transaction is a series of client events for a given client and may start with, for example, an Association Request (e.g., "ASSOC_START"). Transactions may end with either a Run event or any other event with a result-type of failure. Examples of client events may include, for example and without imputing limitation, 'ASSOC_START', 'ASSOC_DONE', 'MOBILITY_DONE', 'RUN', 'DHCP_DONE', AUTH_START', 'EAPOL_START', 'AUTH_DONE', 'BROADCAST_REKEY', SEND_DEAUTH', 'DELETE', 'L2KEY_DONE', SEND_DISASSOC', RECV_DISASSPC', 'RECV_DEAUTH', and 'WEB_AUTH_DONE'.

In particular, where a successful transaction takes more than 10 seconds, it can be identified as an excess onboarding transaction due to the amount of time taken. Excess transactions may often end in a Run state. However, excess transactions take an extended amount of time to resolve relative to a normal amount of time (e.g., average transaction time, etc.) for the respective transaction and, in many cases, one or more event sequences can be identified as relating to an excess transaction. For example, a large number of ASSOC_START events and AUTH_START events may be observed in an event sequence related to an excess transaction. Certain sequences may account for more excess transactions than others. In some examples, the top 10 sequences, or patterns, may account for 50% of all excess transactions even though a very large number of possible patterns may exist.

In effect, onboarding issues can be identified by: filtering out sequences of events observed associated with a client failure; filtering out corresponding event-reason codes; and then tracking additional context such as changes in radio, SSID during the sequence, etc. Issue groups based on common characteristics of the above information can then be created. For example, 60,000 failure events may be grouped into approximately 1,000 groups on a first clustering pass. Groups with distinct event patterns may be aggregated into a single group based on common characteristics such as consecutive AUTH_START events and/or AUTH_DONE events. As a result, customer data can be used to discover new issues that would be otherwise undetected and unimplemented into assurance platforms. Further, assurance and/or analytics platforms may be validated for issue identification and classification.

Intent-based networking is an approach for overcoming the deficiencies, discussed above and elsewhere in the present disclosure, of conventional enterprise networks. The motivation of intent-based networking is to enable a user to describe in plain language what he or she wants to accomplish (e.g., the user's intent) and have the network translate the user's objective into configuration and policy changes that are automatically propagated across a complex and heterogeneous computing environment. Thus, an intent-based network can abstract network complexity, automate much of the work of provisioning and managing the network typically handled by a network administrator, and assure secure operation and optimal performance of the network. As an intent-based network becomes aware of the users, devices, and things making connections in the network, it can automatically apply security permissions and service levels in accordance with the privileges and quality of experience (QoE) assigned to the users, devices, and things. Table 1 sets forth examples of intents and workflows that can be automated by an intent-based network to achieve a desired outcome.

TABLE 1

Examples of Intents and Associated Workflows

| Intent | Workflow |
| --- | --- |
| I need to scale out my application database | Extend network segments; update load balancer configuration; configure quality of service (QoS) |
| I have scheduled a telemedicine session at 10 am | Create high-definition (HD) video connection; prioritize with end-to-end QoS; validate performance; keep the communication safe; tear down connection after call |
| I am rolling out a new IoT app for factory equipment monitoring | Create a new segment for all factory devices to connect to the IoT app; isolate from other traffic; apply service level agreement (SLA); validate SLA; optimize traffic flow |
| I need to deploy a secure multi-tier application | Provision multiple networks and subnets; configure access control lists (ACLs) and firewall rules; advertise routing information |

Some additional examples of use cases of an intent-based network:

An intent-based network can learn the performance needs of applications and services and adapt the network from end-to-end to achieve specified service levels;

Instead of sending technicians to every office, floor, building, or branch, an intent-based network can discover and identify devices and things as they connect, assign security and micro-segmentation profiles according to established policies, and continuously monitor access point performance to automatically adjust for QoE;

Users can move freely among network segments, mobile device in hand, and automatically connect with the correct security and access privileges;

Switches, routers, and other network devices can be powered up by local non-technical office personnel, and the network devices can be configured remotely (by a user or by the network) via a cloud management console with the appropriate policies as defined by the intents for the specific location (e.g., permanent employee access, visiting employee access, guest access, etc.); and Machine learning and artificial intelligence agents running in the network can continuously monitor and analyze network traffic and connections, compare activity against pre-defined intents such as application performance or security policies, detect malware intrusions in encrypted traffic and automatically isolate infected devices, and provide a historical record of network events for analysis and troubleshooting.

FIG. 1 illustrates an example of a physical topology of an enterprise network 100 for providing intent-based networking. It should be understood that, for the enterprise network 100 and any network discussed herein, there can be additional or fewer nodes, devices, links, networks, or components in similar or alternative configurations. Example embodiments with different numbers and/or types of endpoints, nodes, cloud components, servers, software components, devices, virtual or physical resources, configurations, topologies, services, appliances, or deployments are also contemplated herein. Further, the enterprise network 100 can include any number or type of resources, which can be accessed and utilized by endpoints or network devices. The illustrations and examples provided herein are for clarity and simplicity.

In this example, the enterprise network 100 includes a management cloud 102 and a network fabric 120. Although shown as an external network or cloud to the network fabric 120 in this example, the management cloud 102 may alternatively or additionally reside on the premises of an organization or in a colocation center (in addition to being hosted by a cloud provider or similar environment). The management cloud 102 can provide a central management plane for building and operating the network fabric 120. The management cloud 102 can be responsible for forwarding configuration and policy distribution, as well as device management and analytics. The management cloud 102 can comprise one or more network controller appliances 104, one or more authentication, authorization, and accounting (AAA) appliances 106, one or more wireless local area network controllers (WLCs) 108, and one or more fabric control plane nodes 110. In other embodiments, one or more elements of the management cloud 102 may be co-located with the network fabric 120.

The network controller appliance(s) 104 can function as the command and control system for one or more network fabrics, and can house automated workflows for deploying and managing the network fabric(s). The network controller appliance(s) 104 can include automation, design, policy, provisioning, and assurance capabilities, among others, as discussed further below with respect to FIG. 2. In some embodiments, one or more Cisco Digital Network Architecture (Cisco DNA™) appliances can operate as the network controller appliance(s) 104.

The AAA appliance(s) 106 can control access to computing resources, facilitate enforcement of network policies, audit usage, and provide information necessary to bill for services. The AAA appliance can interact with the network controller appliance(s) 104 and with databases and directories containing information for users, devices, things, policies, billing, and similar information to provide authentication, authorization, and accounting services. In some embodiments, the AAA appliance(s) 106 can utilize Remote Authentication Dial-In User Service (RADIUS) or Diameter to communicate with devices and applications. In some embodiments, one or more Cisco® Identity Services Engine (ISE) appliances can operate as the AAA appliance(s) 106.

The WLC(s) 108 can support fabric-enabled access points attached to the network fabric 120, handling traditional tasks associated with a WLC as well as interactions with the fabric control plane for wireless endpoint registration and roaming. In some embodiments, the network fabric 120 can implement a wireless deployment that moves data-plane termination (e.g., VXLAN) from a centralized location (e.g., with previous overlay Control and Provisioning of Wireless Access Points (CAPWAP) deployments) to an access point/fabric edge node. This can enable distributed forwarding and distributed policy application for wireless traffic while retaining the benefits of centralized provisioning and administration. In some embodiments, one or more Cisco® Wireless Controllers, Cisco® Wireless LAN, and/or other Cisco DNA™-ready wireless controllers can operate as the WLC(s) 108.

The network fabric 120 can comprise fabric border nodes 122A and 122B (collectively, 122), fabric intermediate nodes 124A-D (collectively, 124), and fabric edge nodes 126A-F (collectively, 126). Although the fabric control plane node(s) 110 are shown to be external to the network fabric 120 in this example, in other embodiments, the fabric control plane node(s) 110 may be co-located with the network fabric 120. In embodiments where the fabric control plane node(s) 110 are co-located with the network fabric 120, the fabric control plane node(s) 110 may comprise a dedicated node or set of nodes or the functionality of the fabric control node(s) 110 may be implemented by the fabric border nodes 122.

The fabric control plane node(s) 110 can serve as a central database for tracking all users, devices, and things as they attach to the network fabric 120, and as they roam around. The fabric control plane node(s) 110 can allow network infrastructure (e.g., switches, routers, WLCs, etc.) to query the database to determine the locations of users, devices, and things attached to the fabric instead of using a flood and learn mechanism. In this manner, the fabric control plane node(s) 110 can operate as a single source of truth about where every endpoint attached to the network fabric 120 is located at any point in time. In addition to tracking specific endpoints (e.g.,/32 address for IPv4,/128 address for IPv6, etc.), the fabric control plane node(s) 110 can also track larger summarized routers (e.g., IP/mask). This flexibility can help in summarization across fabric sites and improve overall scalability.

The fabric border nodes 122 can connect the network fabric 120 to traditional Layer 3 networks (e.g., non-fabric networks) or to different fabric sites. The fabric border nodes 122 can also translate context (e.g., user, device, or thing mapping and identity) from one fabric site to another fabric site or to a traditional network. When the encapsulation is the same across different fabric sites, the translation of fabric context is generally mapped 1:1. The fabric border nodes 122 can also exchange reachability and policy information with fabric control plane nodes of different fabric sites. The fabric border nodes 122 also provide border functions for internal networks and external networks. Internal borders can advertise a defined set of known subnets, such as those leading to a group of branch sites or to a data center. External borders, on the other hand, can advertise unknown destinations (e.g., to the Internet similar in operation to the function of a default route).

The fabric intermediate nodes 124 can operate as pure Layer 3 forwarders that connect the fabric border nodes 122 to the fabric edge nodes 126 and provide the Layer 3 underlay for fabric overlay traffic.

The fabric edge nodes 126 can connect endpoints to the network fabric 120 and can encapsulate/decapsulate and forward traffic from these endpoints to and from the network fabric. The fabric edge nodes 126 may operate at the perimeter of the network fabric 120 and can be the first points for attachment of users, devices, and things and the implementation of policy. In some embodiments, the network fabric 120 can also include fabric extended nodes (not shown) for attaching downstream non-fabric Layer 2 network devices to the network fabric 120 and thereby extend the network fabric. For example, extended nodes can be small switches (e.g., compact switch, industrial Ethernet switch, building automation switch, etc.) which connect to the fabric edge nodes via Layer 2. Devices or things connected to the fabric extended nodes can use the fabric edge nodes 126 for communication to outside subnets.

In this example, the network fabric can represent a single fabric site deployment which can be differentiated from a multi-site fabric deployment as discussed further below with respect to FIG. 4.

In some embodiments, all subnets hosted in a fabric site can be provisioned across every fabric edge node 126 in that fabric site. For example, if the subnet 10.10.10.0/24 is provisioned in a given fabric site, this subnet may be defined across all of the fabric edge nodes 126 in that fabric site, and endpoints located in that subnet can be placed on any fabric edge node 126 in that fabric. This can simplify IP address management and allow deployment of fewer but larger subnets. In some embodiments, one or more Cisco® Catalyst switches, Cisco Nexus® switches, Cisco Meraki® MS switches, Cisco® Integrated Services Routers (ISRs), Cisco® Aggregation Services Routers (ASRs), Cisco® Enterprise Network Compute Systems (ENCS), Cisco® Cloud Service Virtual Routers (CSRvs), Cisco Integrated Services Virtual Routers (ISRvs), Cisco Meraki® MX appliances, and/or other Cisco DNA-ready™ devices can operate as the fabric nodes 122, 124, and 126.

The enterprise network 100 can also include wired endpoints 130A, 130C, 130D, and 130F and wireless endpoints 130B and 130E (collectively, 130). The wired endpoints 130A, 130C, 130D, and 130F can connect by wire to fabric edge nodes 126A, 126C, 126D, and 126F, respectively, and the wireless endpoints 130B and 130E can connect wirelessly to wireless access points 128B and 128E (collectively, 128), respectively, which in turn can connect by wire to fabric edge nodes 126B and 126E, respectively. In some embodiments, Cisco Aironet® access points, Cisco Meraki® MR access points, and/or other Cisco DNA™-ready access points can operate as the wireless access points 128.

The endpoints 130 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 130 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

In some embodiments, the network fabric 120 can support wired and wireless access as part of a single integrated infrastructure such that connectivity, mobility, and policy enforcement behavior are similar or the same for both wired and wireless endpoints. This can bring a unified experience for users, devices, and things that is independent of the access media.

In integrated wired and wireless deployments, control plane integration can be achieved with the WLC(s) 108 notifying the fabric control plane node(s) 110 of joins, roams, and disconnects by the wireless endpoints 130 such that the fabric control plane node(s) can have connectivity information about both wired and wireless endpoints in the network fabric 120, and can serve as the single source of truth for endpoints connected to the network fabric. For data plane integration, the WLC(s) 108 can instruct the fabric wireless access points 128 to form a VXLAN overlay tunnel to their adjacent fabric edge nodes 126. The AP VXLAN tunnel can carry segmentation and policy information to and from the fabric edge nodes 126, allowing connectivity and functionality identical or similar to that of a wired endpoint. When the wireless endpoints 130 join the network fabric 120 via the fabric wireless access points 128, the WLC(s) 108 can onboard the endpoints into the network fabric 120 and inform the fabric control plane node(s) 110 of the endpoints' Media Access Control (MAC) addresses. The WLC(s) 108 can then instruct the fabric wireless access points 128 to form VXLAN overlay tunnels to the adjacent fabric edge nodes 126. Next, the wireless endpoints 130 can obtain IP addresses for themselves via Dynamic Host Configuration Protocol (DHCP). Once that completes, the fabric edge nodes 126 can register the IP addresses of the wireless endpoint 130 to the fabric control plane node(s) 110 to form a mapping between the endpoints' MAC and IP addresses, and traffic to and from the wireless endpoints 130 can begin to flow.

Figure 2:
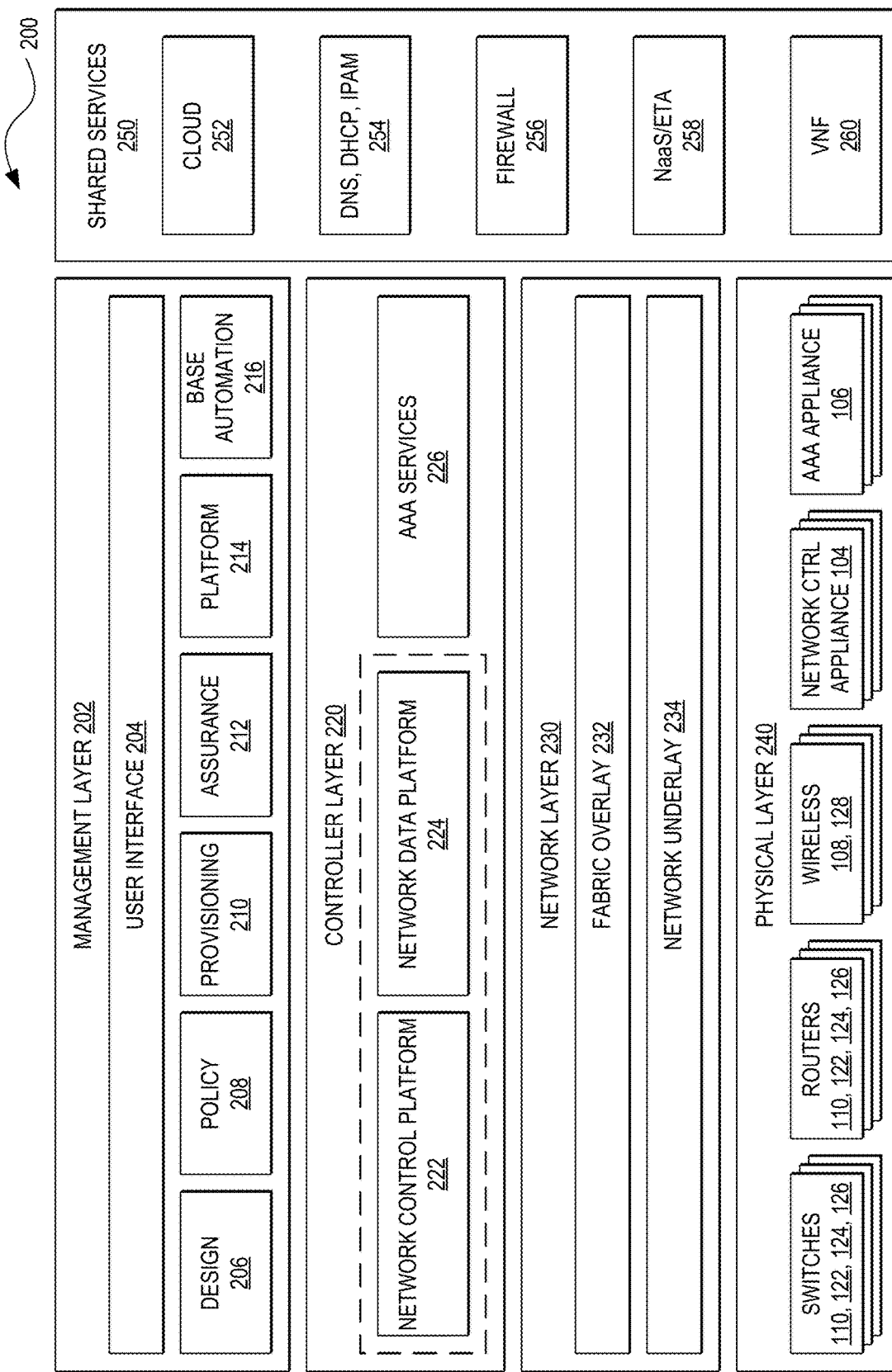
FIG. 2 illustrates an example of a logical architecture for an enterprise network in accordance with some examples.

FIG. 2 illustrates an example of a logical architecture 200 for an enterprise network (e.g., the enterprise network 100). One of ordinary skill in the art will understand that, for the logical architecture 200 and any system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure. In this example, the logical architecture 200 includes a management layer 202, a controller layer 220, a network layer 230 (such as embodied by the network fabric 120), a physical layer 240 (such as embodied by the various elements of FIG. 1), and a shared services layer 250.

The management layer 202 can abstract the complexities and dependencies of other layers and provide a user with tools and workflows to manage an enterprise network (e.g., the enterprise network 100). The management layer 202 can include a user interface 204, design functions 206, policy functions 208, provisioning functions 210, assurance functions 212, platform functions 214, and base automation functions 216. The user interface 204 can provide a user a single point to manage and automate the network. The user interface 204 can be implemented within a web application/web server accessible by a web browser and/or an application/application server accessible by a desktop application, a mobile app, a shell program or other command line interface (CLI), an Application Programming Interface (e.g., restful state transfer (REST), Simple Object Access Protocol (SOAP), Service Oriented Architecture (SOA), etc.), and/or other suitable interface in which the user can configure network infrastructure, devices, and things that are cloud-managed; provide user preferences; specify policies, enter data; review statistics; configure interactions or operations; and so forth. The user interface 204 may also provide visibility information, such as views of a network, network infrastructure, computing devices, and things. For example, the user interface 204 can provide a view of the status or conditions of the network, the operations taking place, services, performance, a topology or layout, protocols implemented, running processes, errors, notifications, alerts, network structure, ongoing communications, data analysis, and so forth.

The design functions 206 can include tools and workflows for managing site profiles, maps and floor plans, network settings, and IP address management, among others. The policy functions 208 can include tools and workflows for defining and managing network policies. The provisioning functions 210 can include tools and workflows for deploying the network. The assurance functions 212 can use machine learning and analytics to provide end-to-end visibility of the network by learning from the network infrastructure, endpoints, and other contextual sources of information. The platform functions 214 can include tools and workflows for integrating the network management system with other technologies. The base automation functions 216 can include tools and workflows to support the policy functions 208, the provisioning functions 210, the assurance functions 212, and the platform functions 214.

In some embodiments, the design functions 206, the policy functions 208, the provisioning functions 210, the assurance functions 212, the platform functions 214, and the base automation functions 216 can be implemented as microservices in which respective software functions are implemented in multiple containers communicating with each rather than amalgamating all tools and workflows into a single software binary. Each of the design functions 206, policy functions 208, provisioning functions 210, assurance functions 212, and platform functions 214 can be viewed as a set of related automation microservices to cover the design, policy authoring, provisioning, assurance, and cross-platform integration phases of the network lifecycle. The base automation functions 214 can support the top-level functions by allowing users to perform certain network-wide tasks.

FIGS. 3A-3I illustrate examples of graphical user interfaces for implementing the user interface 204. Although FIGS. 3A-3I show the graphical user interfaces as comprising webpages displayed in a browser executing on a large form-factor general purpose computing device (e.g., server, workstation, desktop, laptop, etc.), the principles disclosed in the present disclosure are applicable to client devices of other form factors, including tablet computers, smart phones, wearable devices, or other small form-factor general purpose computing devices; televisions; set top boxes; IoT devices; and other electronic devices capable of connecting to a network and including input/output components to enable a user to interact with a network management system. One of ordinary skill will also understand that the graphical user interfaces of FIGS. 3A-3I are but one example of a user interface for managing a network. Other embodiments may include a fewer number or a greater number of elements.

Figure 3A:
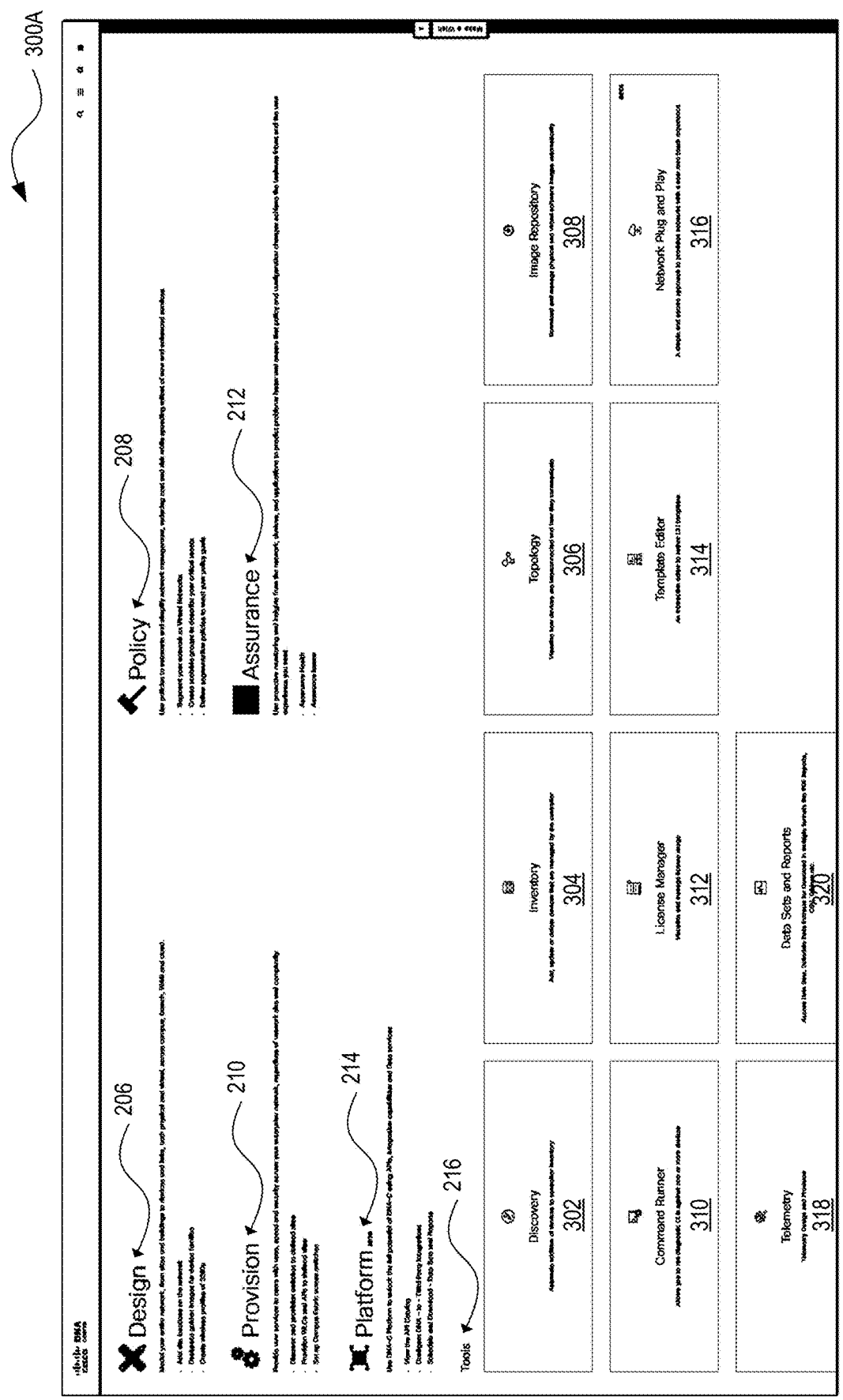

FIG. 3A illustrates a graphical user interface 300A, which is an example of a landing screen or a home screen of the user interface 204. The graphical user interface 300A can include user interface elements for selecting the design functions 206, the policy functions 208, the provisioning functions 210, the assurance functions 212, and the platform functions 214. The graphical user interface 300A also includes user interface elements for selecting the base automation functions 216. In this example, the base automation functions 216 include:

A network discovery tool 302 for automating the discovery of existing network elements to populate into inventory;

An inventory management tool 304 for managing the set of physical and virtual network elements;

A topology tool 306 for visualizing the physical topology of network elements;

An image repository tool 308 for managing software images for network elements;

A command runner tool 310 for diagnosing one or more network elements based on a CLI;

A license manager tool 312 for administering visualizing software license usage in the network;

A template editor tool 314 for creating and authoring CLI templates associated with network elements in a design profile;

A network PnP tool 316 for supporting the automated configuration of network elements;

A telemetry tool 318 for designing a telemetry profile and applying the telemetry profile to network elements; and A data set and reports tool 320 for accessing various data sets, scheduling data extracts, and generating reports in multiple formats (e.g., Post Document Format (PDF), comma-separate values (CSV), Tableau, etc.), such as an inventory data report, a software image management (SWIM) server report, and a client data report, among others.

Figure 3B:

FIG. 3B illustrates a graphical user interface 300B, an example of a landing screen for the design functions 206. The graphical user interface 300B can include user interface elements for various tools and workflows for logically defining an enterprise network. In this example, the design tools and workflows include:

A network hierarchy tool 322 for setting up the geographic location, building, and floor plane details, and associating these with a unique site id;

A network settings tool 324 for setting up network servers (e.g., Domain Name System (DNS), DHCP, AAA, etc.), device credentials, IP address pools, service provider profiles (e.g., QoS classes for a WAN provider), and wireless settings;

An image management tool 326 for managing software images and/or maintenance updates, setting version compliance, and downloading and deploying images;

A network profiles tool 328 for defining LAN, WAN, and WLAN connection profiles (including Service Set Identifiers (SSIDs)); and An authentication template tool 330 for defining modes of authentication (e.g., closed authentication, Easy Connect, open authentication, etc.).

The output of the design workflow 206 can include a hierarchical set of unique site identifiers that define the global and forwarding configuration parameters of the various sites of the network. The provisioning functions 210 may use the site identifiers to deploy the network.

Figure 3C:
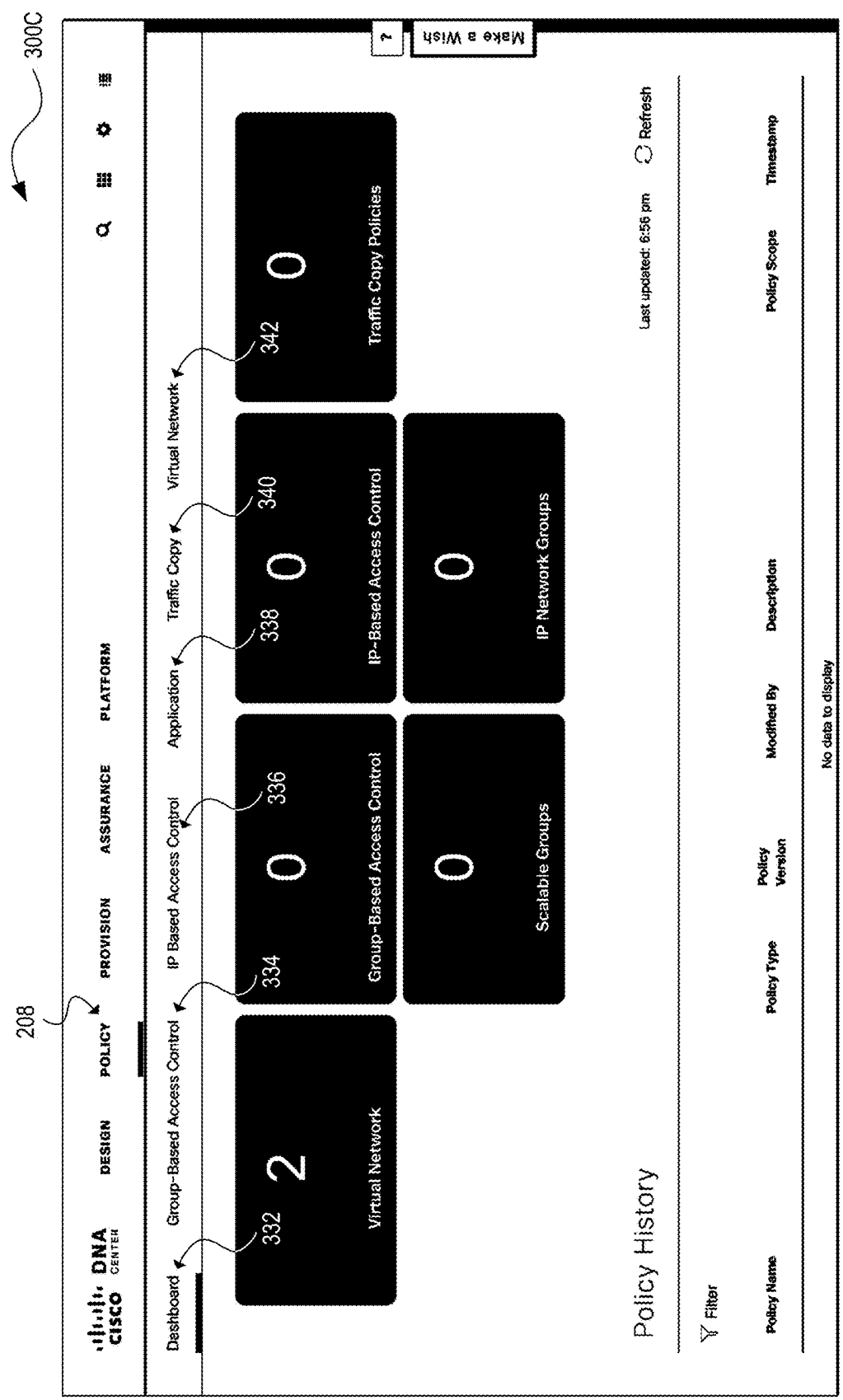

FIG. 3C illustrates a graphical user interface 300C, an example of a landing screen for the policy functions 208. The graphical user interface 300C can include various tools and workflows for defining network policies. In this example, the policy design tools and workflows include:

A policy dashboard 332 for viewing virtual networks, group-based access control policies, IP-based access control policies, traffic copy policies, scalable groups, and IP network groups. The policy dashboard 332 can also show the number of policies that have failed to deploy. The policy dashboard 332 can provide a list of policies and the following information about each policy: policy name, policy type, policy version (e.g., iteration of policy which can be incremented each time the policy changes, user who has modified the policy, description, policy scope (e.g., user and device groups or applications that the policy affects), and timestamp;

A group-based access control policies tool 334 for managing group-based access controls or SGACLs. A group-based access control policy can define scalable groups and an access contract (e.g., rules that make up the access control policies, such as permit or deny when traffic matches on the policy);

An IP-based access control policies tool 336 for managing IP-based access control policies. An IP-based access control can define an IP network group (e.g., IP subnets that share same access control requirements) and an access contract;

An application policies tool 338 for configuring QoS for application traffic. An application policy can define application sets (e.g., sets of applications that with similar network traffic needs) and a site scope (e.g., the site to which an application policy is defined);

A traffic copy policies tool 340 for setting up an Encapsulated Remote Switched Port Analyzer (ERSPAN) configuration such that network traffic flow between two entities is copied to a specified destination for monitoring or troubleshooting. A traffic copy policy can define the source and destination of the traffic flow to copy and a traffic copy contract that specifies the device and interface where the copy of traffic is sent; and A virtual network policies tool 343 for segmenting the physical network into multiple logical networks.

The output of the policy workflow 208 can include a set of virtual networks, security groups, and access and traffic policies that define the policy configuration parameters of the various sites of the network. The provisioning functions 210 may use the virtual networks, groups, and policies for deployment in the network.

Figure 3D:
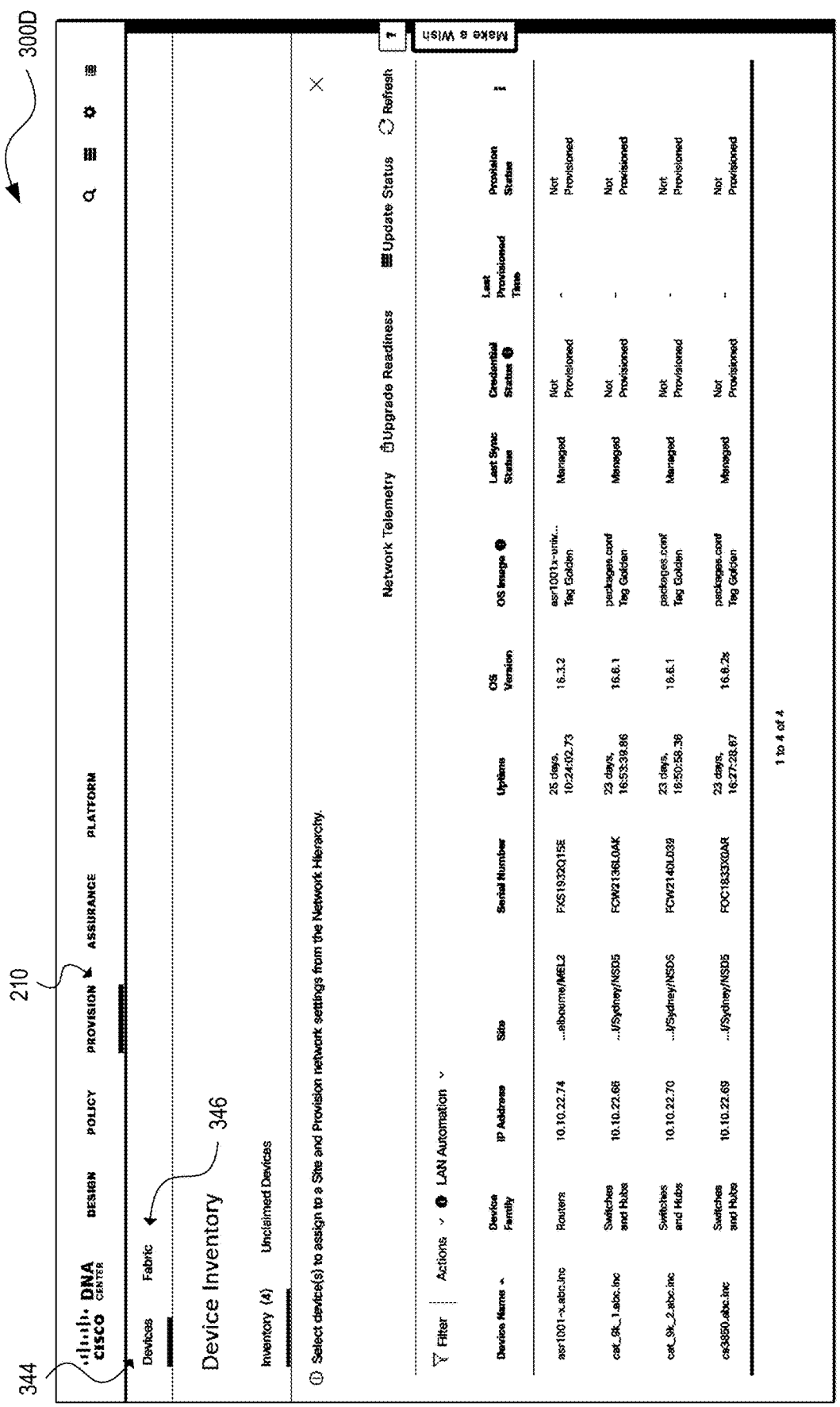

FIG. 3D illustrates a graphical user interface 300D, an example of a landing screen for the provisioning functions 210. The graphical user interface 300D can include various tools and workflows for deploying the network. In this example, the provisioning tools and workflows include:

A device provisioning tool 344 for assigning devices to the inventory and deploying the required settings and policies, and adding devices to sites; and A fabric provisioning tool 346 for creating fabric domains and adding devices to the fabric.

The output of the provisioning workflow 210 can include the deployment of the network underlay and fabric overlay, as well as policies (defined in the policy workflow 208).

Figure 3E:
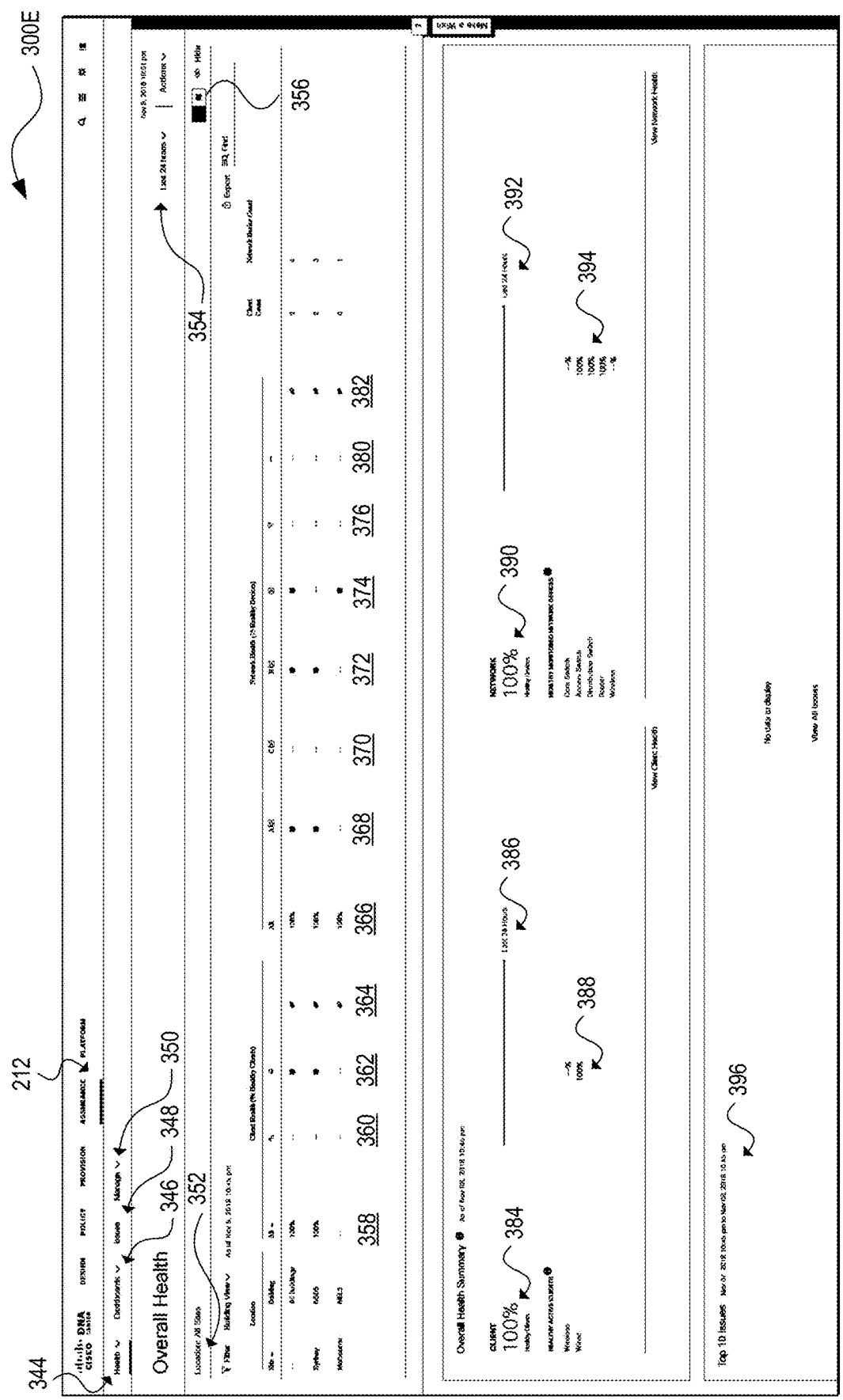

FIG. 3E illustrates a graphical user interface 300E, an example of a landing screen for the assurance functions 212. The graphical user interface 300E can include various tools and workflows for managing the network. In this example, the assurance tools and workflows include:

A health overview tool 344 for providing a global view of the enterprise network, including network infrastructure devices and endpoints. The user interface element (e.g., drop-down menu, a dialog box, etc.) associated with the health overview tool 344 can also be toggled to switch to additional or alternative views, such as a view of the health of network infrastructure devices alone, a view of the health of all wired and wireless clients, and a view of the health of applications running in the network as discussed further below with respect to FIGS. 3F-3H;

An assurance dashboard tool 346 for managing and creating custom dashboards;

An issues tool 348 for displaying and troubleshooting network issues; and

A sensor management tool 350 for managing sensor-driven tests.

The graphical user interface 300E can also include a location selection user interface element 352, a time period selection user interface element 354, and a view type user interface element 356. The location selection user interface element 354 can enable a user to view the overall health of specific sites (e.g., as defined via the network hierarchy tool 322) and/or network domains (e.g., LAN, WLAN, WAN, data center, etc.). The time period selection user interface element 356 can enable display of the overall health of the network over specific time periods (e.g., last 3 hours, last 24 hours, last 7 days, custom, etc.). The view type user interface element 355 can enable a user to toggle between a geographical map view of the sites of the network (not shown) or a hierarchical site/building view (as shown).

Within the hierarchical site/building view, rows can represent the network hierarchy (e.g. sites and buildings as defined by the network hierarchy tool 322); column 358 can indicate the number of healthy clients as a percentage; column 360 can indicate the health of wireless clients by a score (e.g., 1-10), color and/or descriptor (e.g., red or critical associated with a health score 1 to 3 indicating the clients have critical issues, orange or warning associated with a health score of 4 to 7 indicating warnings for the clients, green or no errors or warnings associated with a health score of 8 to 10, grey or no data available associated with a health score of null or 0), or other indicator; column 362 can indicate the health of wired clients by score, color, descriptor, and so forth; column 364 can include user interface elements for drilling down to the health of the clients associated with a hierarchical site/building; column 366 can indicate the number of healthy network infrastructure devices as a percentage; column 368 can indicate the health of access switches by score, color, descriptor, and so forth; column 370 can indicate the health of core switches by score, color, descriptor, and so forth; column 372 can indicate the health of distribution switches by score, color, descriptor, and so forth; column 374 can indicate the health of routers by score, color, descriptor, and so forth; column 376 can indicate the health of WLCs by score, color, descriptor, and so forth; column 378 can indicate the health of other network infrastructure devices by score, color, descriptor, and so forth; and column 380 can include user interface elements for drilling down to the health of the network infrastructure devices associated with a hierarchical site/building. In other embodiments, client devices may be grouped in other ways besides wired or wireless, such as by device type (e.g., desktop, laptop, mobile phone, IoT device or more specific type of IoT device, etc.), manufacturer, model, operating system, and so forth. Likewise, network infrastructure devices can also be grouped along these and other ways in additional embodiments.

The graphical user interface 300E can also include an overall health summary user interface element (e.g., a view, pane, tile, card, container, widget, dashlet, etc.) that includes a client health summary user interface element 384 indicating the number of healthy clients as a percentage, a color coded trend chart 386 indicating that percentage over a specific time period (e.g., as selected by the time period selection user interface element 354), a user interface element 388 breaking down the number of healthy clients as a percentage by client type (e.g., wireless, wired), a network infrastructure health summary user interface element 390 indicating the number of health network infrastructure devices as a percentage, a color coded trend chart 392 indicating that percentage over a specific time period, and a user interface element 394 breaking down the number of network infrastructure devices as a percentage by network infrastructure device type (e.g., core switch, access switch, distribution switch, etc.).

The graphical user interface 300E can also include an issues user interface element 396 listing issues, if any, that must be addressed. Issues can be sorted based on timestamp, severity, location, device type, and so forth. Each issue may be selected to drill down to view a more detailed view of the selected issue.

Figure 3F:
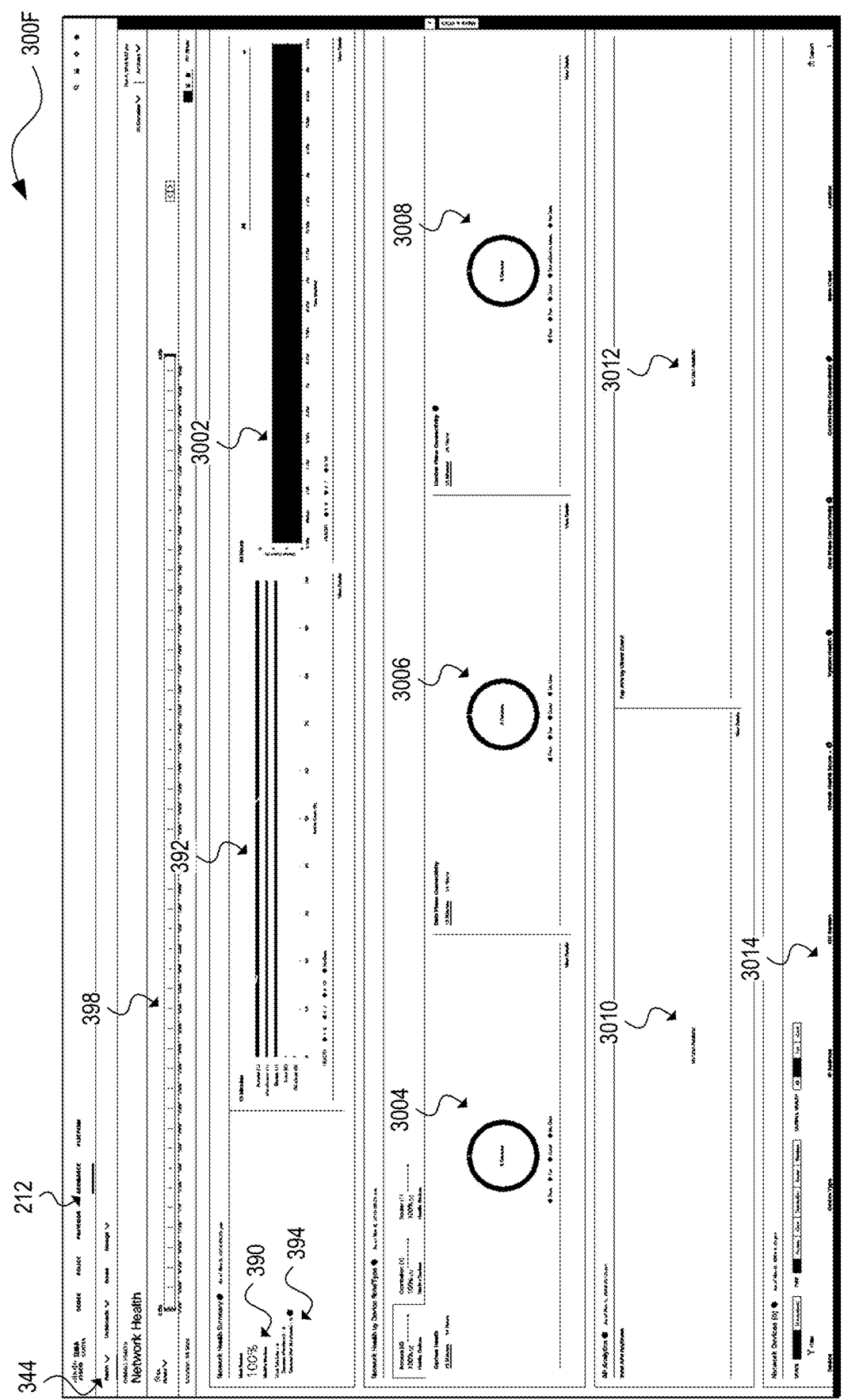

FIG. 3F illustrates a graphical user interface 300F, an example of a screen for an overview of the health of network infrastructure devices alone, which may be navigated to, for instance, by toggling the health overview tool 344. The graphical user interface 300F can include a timeline slider 398 for selecting a more granular time range than a time period selection user interface element (e.g., the time period selection user interface element 354). The graphical user interface 300F can also include similar information to that shown in the graphical user interface 300E, such as a user interface element comprising a hierarchical site/building view and/or geographical map view similar to that of the graphical user interface 300E (except providing information only for network infrastructure devices) (not shown here), the number of healthy network infrastructure devices as a percentage 390, the color coded trend charts 392 indicating that percentage by device type, the breakdown of the number of healthy network infrastructure devices by device type 394, and so forth. In addition, the graphical user interface 300F can display a view of the health of network infrastructure devices by network topology (not shown). This view can be interactive, such as by enabling a user to zoom in or out, pan left or right, or rotate the topology (e.g., by 90 degrees).

In this example, the graphical user interface 300F also includes a color coded trend chart 3002 showing the performance of the network infrastructure devices over a specific time period; network health by device type tabs including a system health chart 3004 providing system monitoring metrics (e.g., CPU utilization, memory utilization, temperature, etc.), a data plane connectivity chart 3006 providing data plane metrics, such as uplink availability and link errors, and a control plane connectivity chart 3008 providing control plane metrics for each device type; an AP analytics user interface element including an up and down color coded chart 3010 that provides AP status information (e.g., the number of APs connected to the network, and the number of APs not connected to the network, etc.) and a top number N of APs by client count chart 3012 that provides information about the APs that have the highest number of clients; a network devices table 3014 enabling a user to filter (e.g., by device type, health, or custom filters), view, and export network device information. A detailed view of the health of each network infrastructure device can also be provided by selecting that network infrastructure device in the network devices table 3014.

Figure 3G:
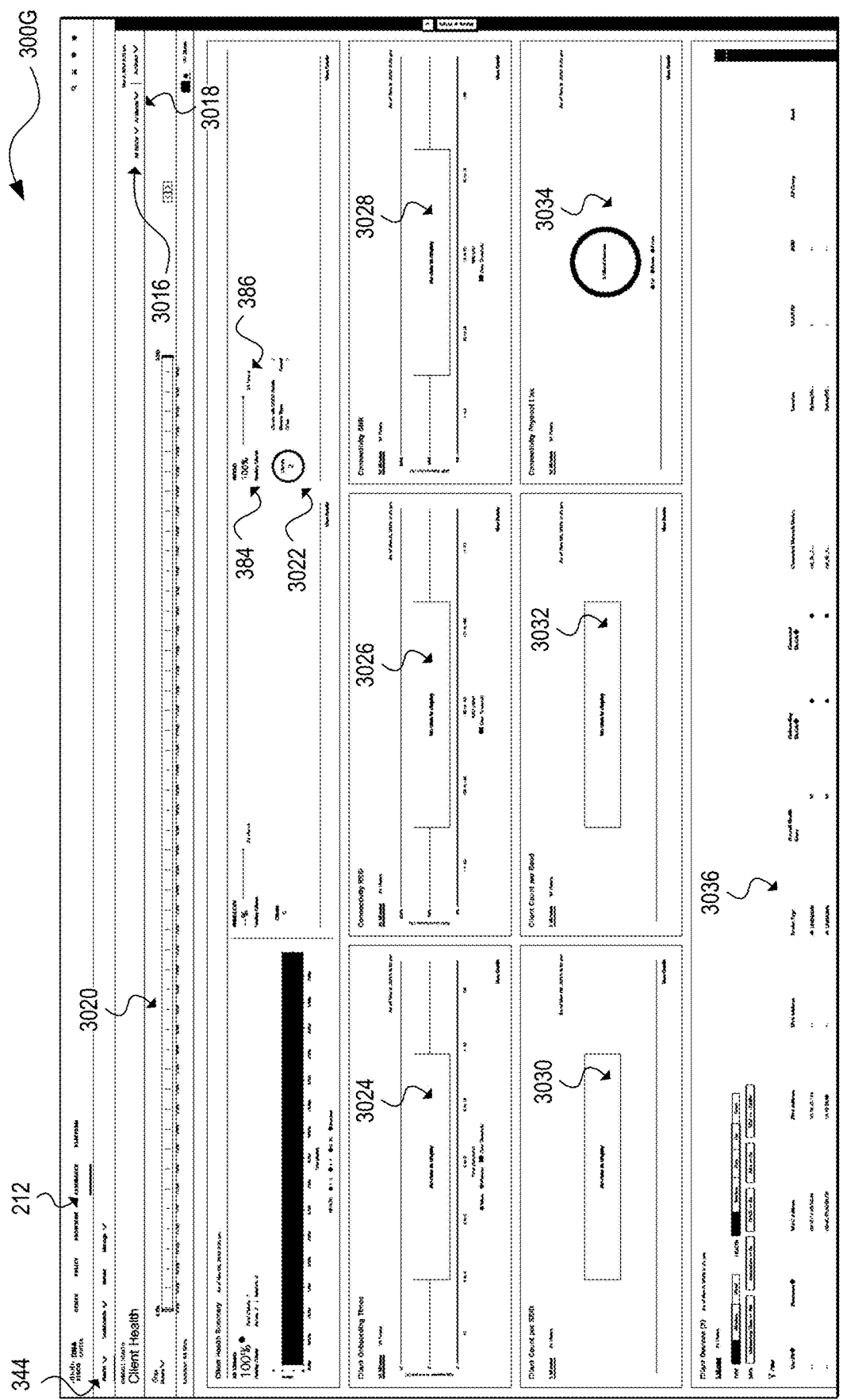

FIG. 3G illustrates a graphical user interface 300G, an example of a screen for an overview of the health of client devices, which may be navigated to, for instance, by toggling the health overview tool 344. The graphical user interface 300G can include an SSID user interface selection element 3016 for viewing the health of wireless clients by all SSIDs or a specific SSID, a band frequency user interface selection element 3018 for viewing the health of wireless clients by all band frequencies or a specific band frequency (e.g., 2.4 GHz, 5 GHz, etc.), and a time slider 3020 that may operate similarly to the time slider 398.

The graphical user interface 300G can also include a client health summary user interface element that provides similar information to that shown in the graphical user interface 300E, such as the number of healthy clients as a percentage 384 and a color coded trend chart 386 indicating that percentage over a specific time period for each grouping of client devices (e.g., wired/wireless, device type, manufacturer, model, operating system, etc.). In addition, the client health summary user interface element can include a color-coded donut chart that provides a count of poor (e.g., red and indicating a client health score of 1 to 3), fair (e.g., orange and indicating a client health score of 4 to 7), good (e.g., green and indicating a health score of 8 to 10), and inactive (e.g., grey and indicating a health score that is null or 0) client devices. The count of client devices associated with each color, health score, health descriptor, and so forth may be displayed by a selection gesture directed toward that color (e.g., tap, double tap, long press, hover, click, right-click, etc.).

The graphical user interface 300G can also include a number of other client health metric charts in all sites or a selected site over a specific time period, such as:
Client onboarding times 3024;
Received Signal Strength Indications (RSSIs) 3026;
Connectivity signal-to-noise ratios (SNRs) 3028;
Client counts per SSID 3030;
Client counts per band frequency 3032;
DNS requests and response counters (not shown); and
Connectivity physical link state information 3034 indicating the distribution of wired client devices that had their physical links up, down, and had errors.

In addition, the graphical user interface 300G can include a client devices table 3036 enabling a user to filter (e.g., by device type, health, data (e.g., onboarding time>threshold, association time>threshold, DHCP>threshold, AAA>threshold, RSSI>threshold, etc.), or custom filters), view, and export client device information (e.g., user identifier, hostname, MAC address, IP address, device type, last heard, location, VLAN identifier, SSID, overall health score, onboarding score, connection score, network infrastructure device to which the client device is connected, etc.). A detailed view of the health of each client device can also be provided by selecting that client device in the client devices table 3036.

Figure 3H:
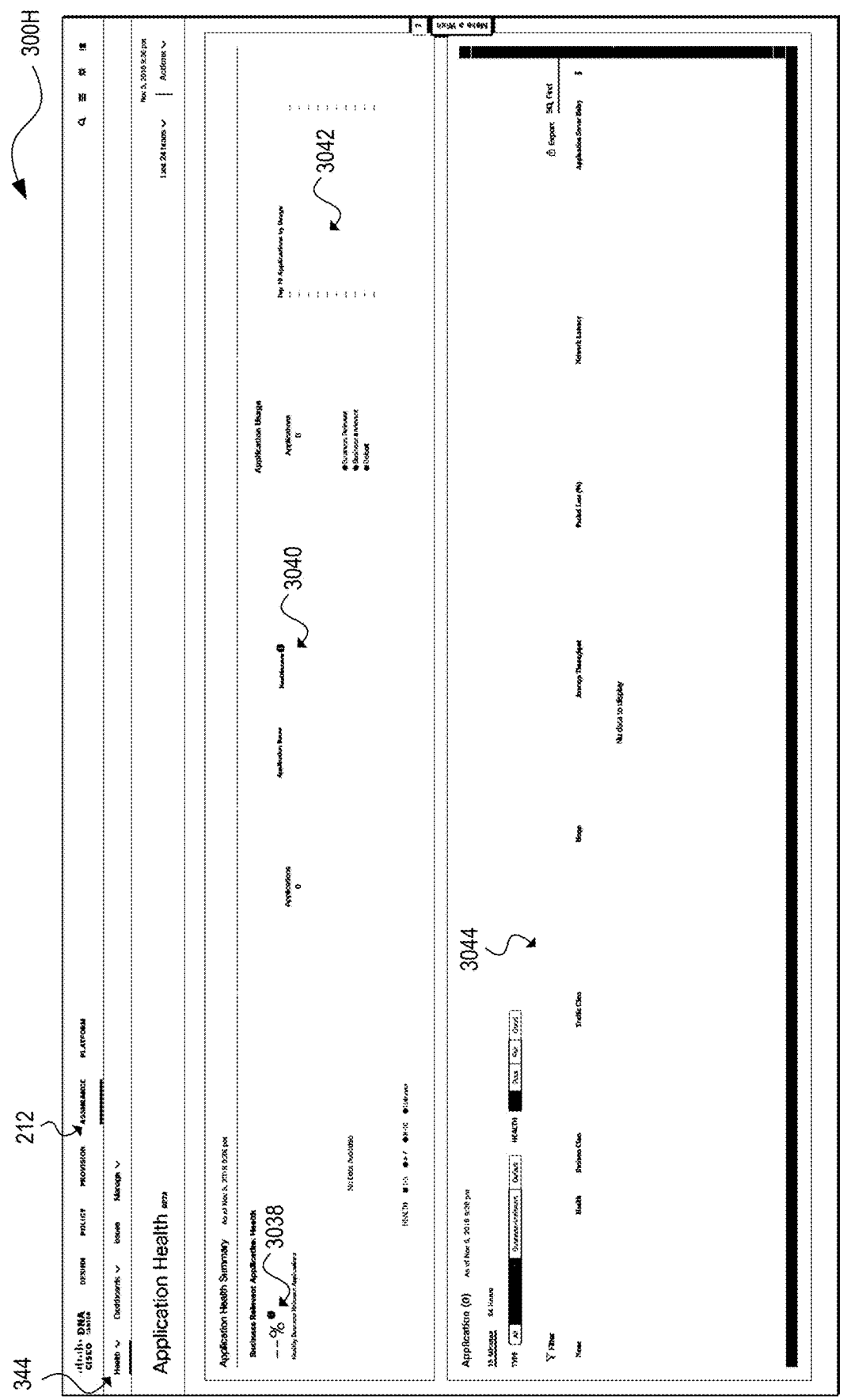
Figure 31:
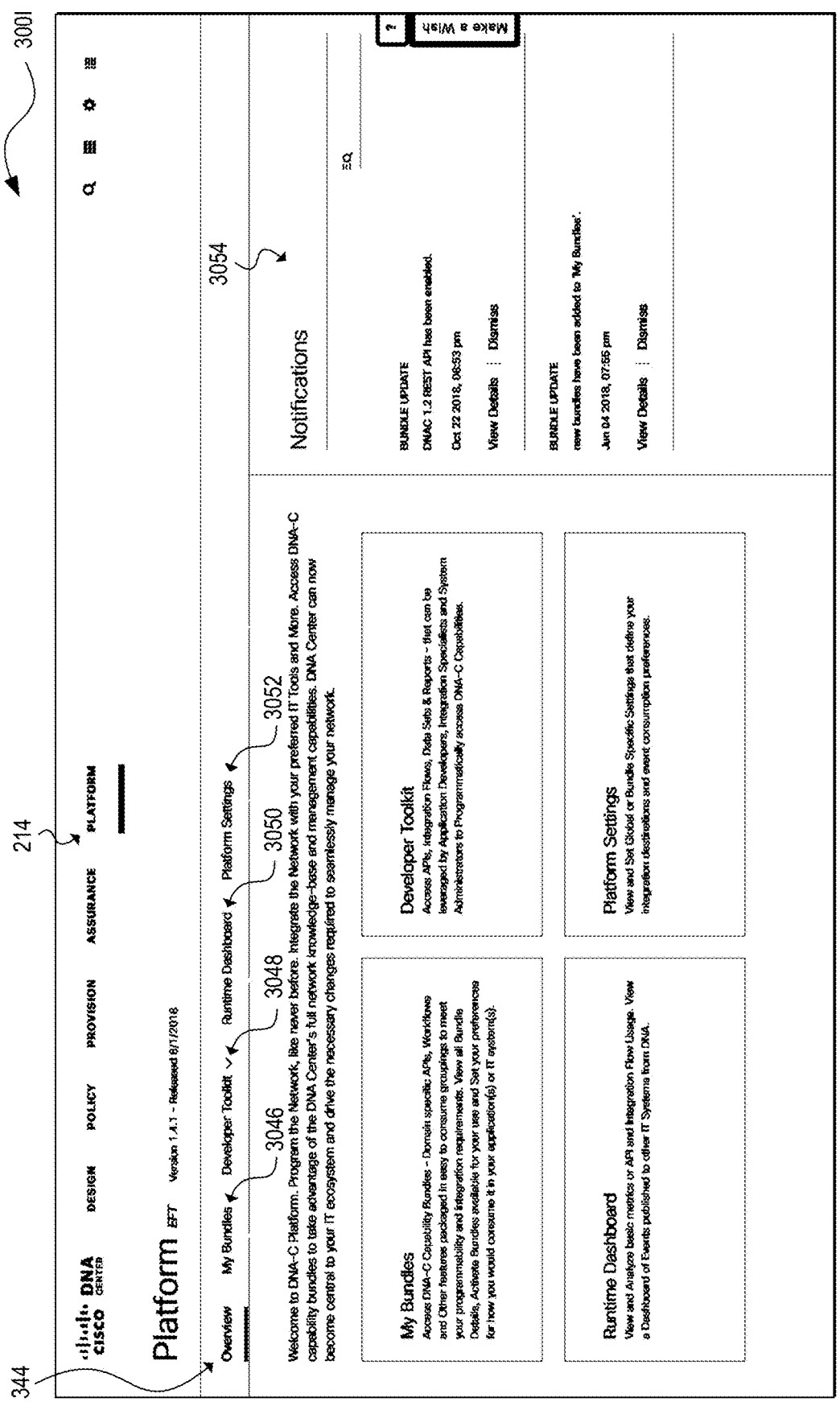

FIG. 3H illustrates a graphical user interface 300H, an example of a screen for an overview of the health of applications, which may be navigated to, for instance, by the toggling the health overview tool 344. The graphical user interface 300H can include application health summary user interface element including a percentage 3038 of the number of healthy applications as a percentage, a health score 3040 for each application or type of application (e.g., business relevant, business irrelevant, default; HTTP, VoIP, chat, email, bulk transfer, multimedia/streaming, etc.) running in the network, a top number N of applications by usage chart 3042. The health score 3040 can be calculated based on an application's qualitative metrics, such as packet loss, network latency, and so forth.

In addition, the graphical user interface 300H can also include an applications table 3044 enabling a user to filter (e.g., by application name, domain name, health, usage, average throughput, traffic class, packet loss, network latency, application latency, custom filters, etc.), view, and export application information. A detailed view of the health of each application can also be provided by selecting that application in the applications table 3044.

FIG. 3I illustrates an example of a graphical user interface 300I, an example of a landing screen for the platform functions 210. The graphical user interface 300C can include various tools and workflows for integrating with other technology systems. In this example, the platform integration tools and workflows include:
- A bundles tool 3046 for managing packages of domain-specific APIs, workflows, and other features for network programming and platform integration;
- A developer toolkit 3048 for accessing an API catalog listing the available APIs and methods (e.g., GET, PUT, POST, DELETE, etc.), descriptions, runtime parameters, return codes, model schemas, and so forth. In some embodiments, the developer toolkit 3048 can also include a "Try It" button to permit a developer to experiment with a particular API to better understand its behavior;
- A runtime dashboard 3050 for viewing and analyzing basic metrics or API and integration flow usage;
- A platform settings tool 3052 to view and set global or bundle-specific settings that define integration destinations and event consumption preferences; and
- A notifications user interface element 3054 for presenting notifications regarding the availability of software updates, security threats, and so forth.

Returning to FIG. 2, the controller layer 220 can comprise subsystems for the management layer 220 and may include a network control platform 222, a network data platform 224, and AAA services 226. These controller subsystems can form an abstraction layer to hide the complexities and dependencies of managing many network elements and protocols.

The network control platform 222 can provide automation and orchestration services for the network layer 230 and the physical layer 240, and can include the settings, protocols, and tables to automate management of the network and physical layers. For example, the network control platform 230 can provide the design functions 206, the provisioning functions 208 212. In addition, the network control platform 230 can include tools and workflows for discovering switches, routers, wireless controllers, and other network infrastructure devices (e.g., the network discovery tool 302); maintaining network and endpoint details, configurations, and software versions (e.g., the inventory management tool 304); Plug-and-Play (PnP) for automating deployment of network infrastructure (e.g., the network PnP tool 316), Path Trace for creating visual data paths to accelerate the troubleshooting of connectivity problems, Easy QoS for automating quality of service to prioritize applications across the network, and Enterprise Service Automation (ESA) for automating deployment of physical and virtual network services, among others. The network control platform 222 can communicate with network elements using Network Configuration (NETCONF)/Yet Another Next Generation (YANG), Simple Network Management Protocol (SNMP), Secure Shell (SSH)/Telnet, and so forth. In some embodiments, the Cisco® Network Control Platform (NCP) can operate as the network control platform 222

The network data platform 224 can provide for network data collection, analytics, and assurance, and may include the settings, protocols, and tables to monitor and analyze network infrastructure and endpoints connected to the network. The network data platform 224 can collect multiple types of information from network infrastructure devices, including syslog, SNMP, NetFlow, Switched Port Analyzer (SPAN), and streaming telemetry, among others. The network data platform 224 can also collect use contextual information shared from In some embodiments, one or more Cisco DNA™ Center appliances can provide the functionalities of the management layer 210, the network control platform 222, and the network data platform 224. The Cisco DNA™ Center appliances can support horizontal scalability by adding additional Cisco DNA™ Center nodes to an existing cluster; high availability for both hardware components and software packages; backup and store mechanisms to support disaster discovery scenarios; role-based access control mechanisms for differentiated access to users, devices, and things based on roles and scope; and programmable interfaces to enable integration with third party vendors. The Cisco DNA™ Center appliances can also be cloud-tethered to provide for the upgrade of existing functions and additions of new packages and applications without having to manually download and install them.

The AAA services 226 can provide identity and policy services for the network layer 230 and physical layer 240, and may include the settings, protocols, and tables to support endpoint identification and policy enforcement services. The AAA services 226 can provide tools and workflows to manage virtual networks and security groups, and to create group-based policies and contracts. The AAA services 226 can identify and profile network infrastructure devices and endpoints using AAA/RADIUS, 802.1X, MAC Authentication Bypass (MAB), web authentication, and EasyConnect, among others. The AAA services 226 can also collect and use contextual information from the network control platform 222, the network data platform 224, and the shared services 250, among others. In some embodiments, Cisco® ISE can provide the AAA services 226.

The network layer 230 can be conceptualized as a composition of two layers, an underlay 234 comprising physical and virtual network infrastructure (e.g., routers, switches, WLCs, etc.) and a Layer 3 routing protocol for forwarding traffic, and an overlay 232 comprising a virtual topology for logically connecting wired and wireless users, devices, and things and applying services and policies to these entities. Network elements of the underlay 234 can establish connectivity between each other, such as via Internet Protocol (IP). The underlay may use any topology and routing protocol.

In some embodiments, the network controller 104 can provide a local area network (LAN) automation service, such as implemented by Cisco DNA™ Center LAN Automation, to automatically discover, provision, and deploy network devices. Once discovered, the automated underlay provisioning service can leverage Plug and Play (PnP) to apply the required protocol and network address configurations to the physical network infrastructure. In some embodiments, the LAN automation service may implement the Intermediate System to Intermediate System (IS-IS) protocol. Some of the advantages of IS-IS include neighbor establishment without IP protocol dependencies, peering capability using loopback addresses, and agnostic treatment of IPv4, IPv6, and non-IP traffic.

The overlay 232 can be a logical, virtualized topology built on top of the physical underlay 234, and can include a fabric data plane, a fabric control plane, and a fabric policy plane. In some embodiments, the fabric data plane can be created via packet encapsulation using Virtual Extensible LAN (VXLAN) with Group Policy Option (GPO). Some of the advantages of VXLAN-GPO include its support for both Layer 2 and Layer 3 virtual topologies (overlays), and its ability to operate over any IP network with built-in network segmentation.

In some embodiments, the fabric control plane can implement Locator/ID Separation Protocol (LISP) for logically mapping and resolving users, devices, and things. LISP can simplify routing by removing the need for each router to process every possible IP destination address and route. LISP can achieve this by moving remote destination to a centralized map database that allows each router to manage only its local routs and query the map system to locate destination endpoints.

The fabric policy plane is where intent can be translated into network policy. That is, the policy plane is where the network operator can instantiate logical network policy based on services offered by the network fabric 120, such as security segmentation services, quality of service (QoS), capture/copy services, application visibility services, and so forth.

Segmentation is a method or technology used to separate specific groups of users or devices from other groups for the purpose of reducing congestion, improving security, containing network problems, controlling access, and so forth. As discussed, the fabric data plane can implement VXLAN encapsulation to provide network segmentation by using the virtual network identifier (VNI) and Scalable Group Tag (SGT) fields in packet headers. The network fabric 120 can support both macro-segmentation and micro-segmentation. Macro-segmentation logically separates a network topology into smaller virtual networks by using a unique network identifier and separate forwarding tables. This can be instantiated as a virtual routing and forwarding (VRF) instance and referred to as a virtual network (VN). That is, a VN is a logical network instance within the network fabric 120 defined by a Layer 3 routing domain and can provide both Layer 2 and Layer 3 services (using the VXLAN VNI to provide both Layer 2 and Layer 3 segmentation). Micro-segmentation logically separates user or device groups within a VN, by enforcing source to destination access control permissions, such as by using access control lists (ACLs). A scalable group is a logical object identifier assigned to a group of users, devices, or things in the network fabric 120. It can be used as source and destination classifiers in Scalable Group ACLs (SGACLs). The SGT can be used to provide address-agnostic group-based policies.

In some embodiments, the fabric control plane node 110 may implement the Locator/Identifier Separation Protocol (LISP) to communicate with one another and with the management cloud 102. Thus, the control plane nodes may operate a host tracking database, a map server, and a map resolver. The host tracking database can track the endpoints 130 connected to the network fabric 120 and associate the endpoints to the fabric edge nodes 126, thereby decoupling an endpoint's identifier (e.g., IP or MAC address) from its location (e.g., closest router) in the network.

The physical layer 240 can comprise network infrastructure devices, such as switches and routers 110, 122, 124, and 126 and wireless elements 108 and 128 and network appliances, such as the network controller appliance(s) 104, and the AAA appliance(s) 106.

The shared services layer 250 can provide an interface to external network services, such as cloud services 252; Domain Name System (DNS), DHCP, IP Address Management (IPAM), and other network address management services 254; firewall services 256; Network as a Sensor (Naas)/Encrypted Threat Analytics (ETA) services; and Virtual Network Functions (VNFs) 260; among others. The management layer 202 and/or the controller layer 220 can share identity, policy, forwarding information, and so forth via the shared services layer 250 using APIs.

Figure 4:
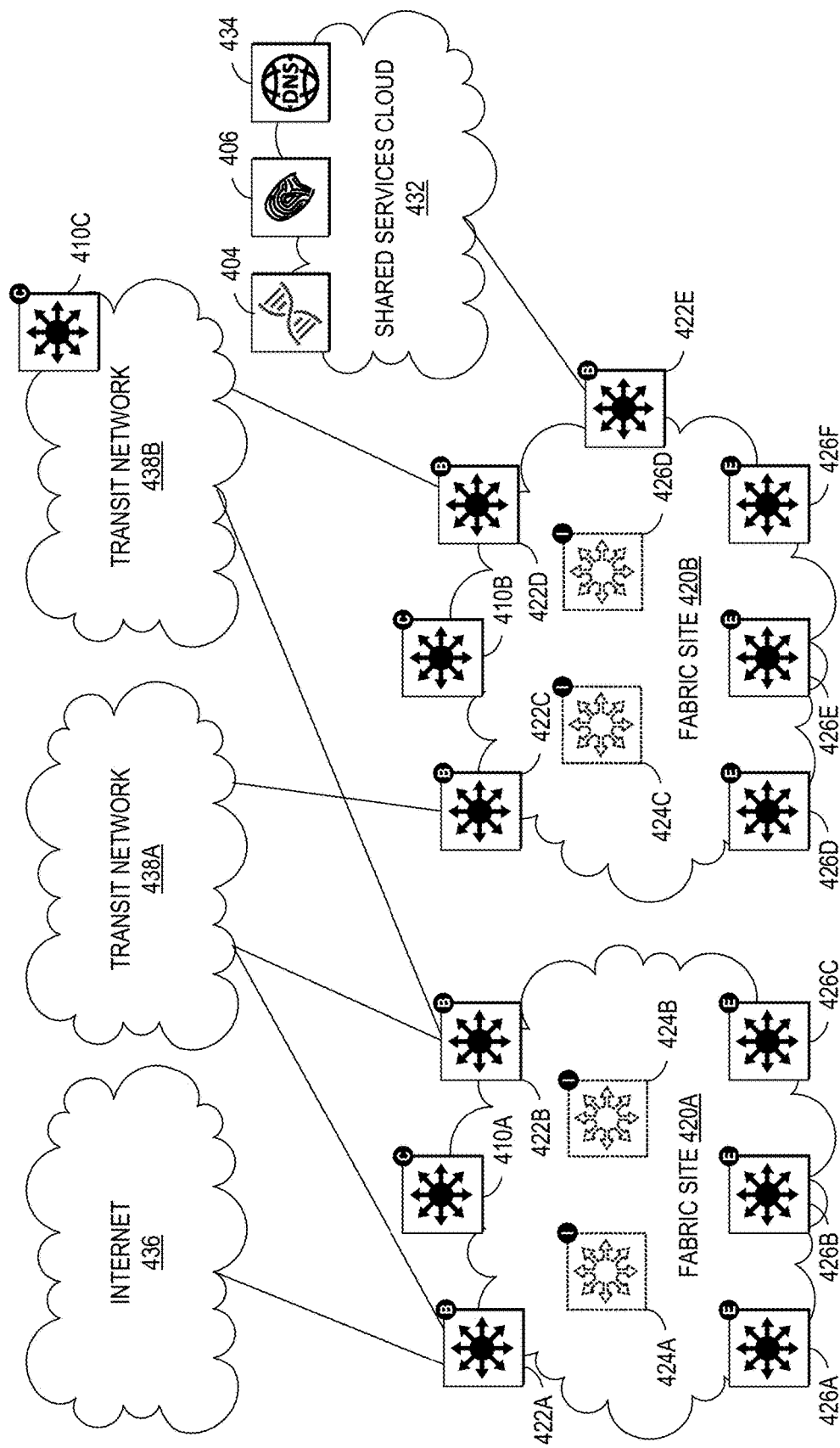
FIG. 4 illustrates an example of a physical topology for a multi-site enterprise network in accordance with some examples.

FIG. 4 illustrates an example of a physical topology for a multi-site enterprise network 400. In this example, the network fabric comprises fabric sites 420A and 420B. The fabric site 420A can include a fabric control node 410A, fabric border nodes 422A and 422B, fabric intermediate nodes 424A and 424B (shown here in dashed line and not connected to the fabric border nodes or the fabric edge nodes for simplicity), and fabric edge nodes 426A-D. The fabric site 420B can include a fabric control node 410B, fabric border nodes 422C-E, fabric intermediate nodes 424C and 424D, and fabric edge nodes 426D-F. Multiple fabric sites corresponding to a single fabric, such as the network fabric of FIG. 4, can be interconnected by a transit network. A transit network can be a portion of a network fabric that has its own control plane nodes and border nodes but does not have edge nodes. In addition, a transit network shares at least one border node with each fabric site that it interconnects.

In general, a transit network connects a network fabric to the external world. There are several approaches to external connectivity, such as a traditional IP network 436, traditional WAN 438A, Software-Defined WAN (SD-WAN) (not shown), or Software-Defined Access (SD-Access) 438B. Traffic across fabric sites, and to other types of sites, can use the control plane and data plane of the transit network to provide connectivity between these sites. A local border node can operate as the handoff point from the fabric site, and the transit network can deliver traffic to other sites. The transit network may use additional features. For example, if the transit network is a WAN, then features like performance routing may also be used. To provide end-to-end policy and segmentation, the transit network should be capable of carrying endpoint context information (e.g., VRF, SGT) across the network. Otherwise, a re-classification of the traffic may be needed at the destination site border.

The local control plane in a fabric site may only hold state relevant to endpoints that are connected to edge nodes within the local fabric site. The local control plane can register local endpoints via local edge nodes, as with a single fabric site (e.g., the network fabric 120). An endpoint that isn't explicitly registered with the local control plane may be assumed to be reachable via border nodes connected to the transit network. In some embodiments, the local control plane may not hold state for endpoints attached to other fabric sites such that the border nodes do not register information from the transit network. In this manner, the local control plane can be independent of other fabric sites, thus enhancing overall scalability of the network.

The control plane in the transit network can hold summary state for all fabric sites that it interconnects. This information can be registered to the transit control plane by border from different fabric sites. The border nodes can register EID information from the local fabric site into the transit network control plane for summary EIDs only and thus further improve scalability.

The multi-site enterprise network 400 can also include a shared services cloud 432. The shared services cloud 432 can comprise one or more network controller appliances 404, one or more AAA appliances 406, and other shared servers (e.g., DNS; DHCP; IPAM; SNMP and other monitoring tools; NetFlow, syslog, and other data collectors, etc.) may reside. These shared services can generally reside outside of the network fabric and in a global routing table (GRT) of an existing network. In this case, some method of inter-VRF routing may be required. One option for inter-VRF routing is to use a fusion router, which can be an external router that performs inter-VRF leaking (e.g., import/export of VRF routes) to fuse the VRFs together. Multi-Protocol can be used for this route exchange since it can inherently prevent routing loops (e.g., using the AS_PATH attribute). Other routing protocols can also be used but may require complex distribute-lists and prefix-lists to prevent loops.

However, there can be several disadvantages in using a fusion router to achieve inter-VN communication, such as route duplication because routes leaked from one VRF to another are programmed in hardware tables and can result in more TCAM utilization, manual configuration at multiple touch points wherever route-leaking is implemented, loss of SGT context because SGTs may not be maintained across VRFs and must be re-classified once the traffic enters the other VRF, and traffic hairpinning because traffic may need to be routed to the fusion router, and then back to the fabric border node.

SD-Access Extranet can provide a flexible and scalable method for achieving inter-VN communications by avoiding route duplication because inter-VN lookup occurs in the fabric control plane (e.g., software) such that route entries do not need to be duplicated in hardware; providing a single touchpoint because the network management system (e.g., Cisco DNA™ Center) can automate the inter-VN lookup policy, making it a single point of management; maintaining SGT context because the inter-VN lookup occurs in the control plane node(s) (e.g., software), and avoids hairpinning because inter-VN forwarding can occur at the fabric edge (e.g., the same intra-VN) so traffic does not need to hairpin at the border node. Another advantage is that a separate VN can be made for each of the common resources that are needed (e.g., a Shared Services VN, an Internet VN, a data center VN, etc.).

Figure 5A:
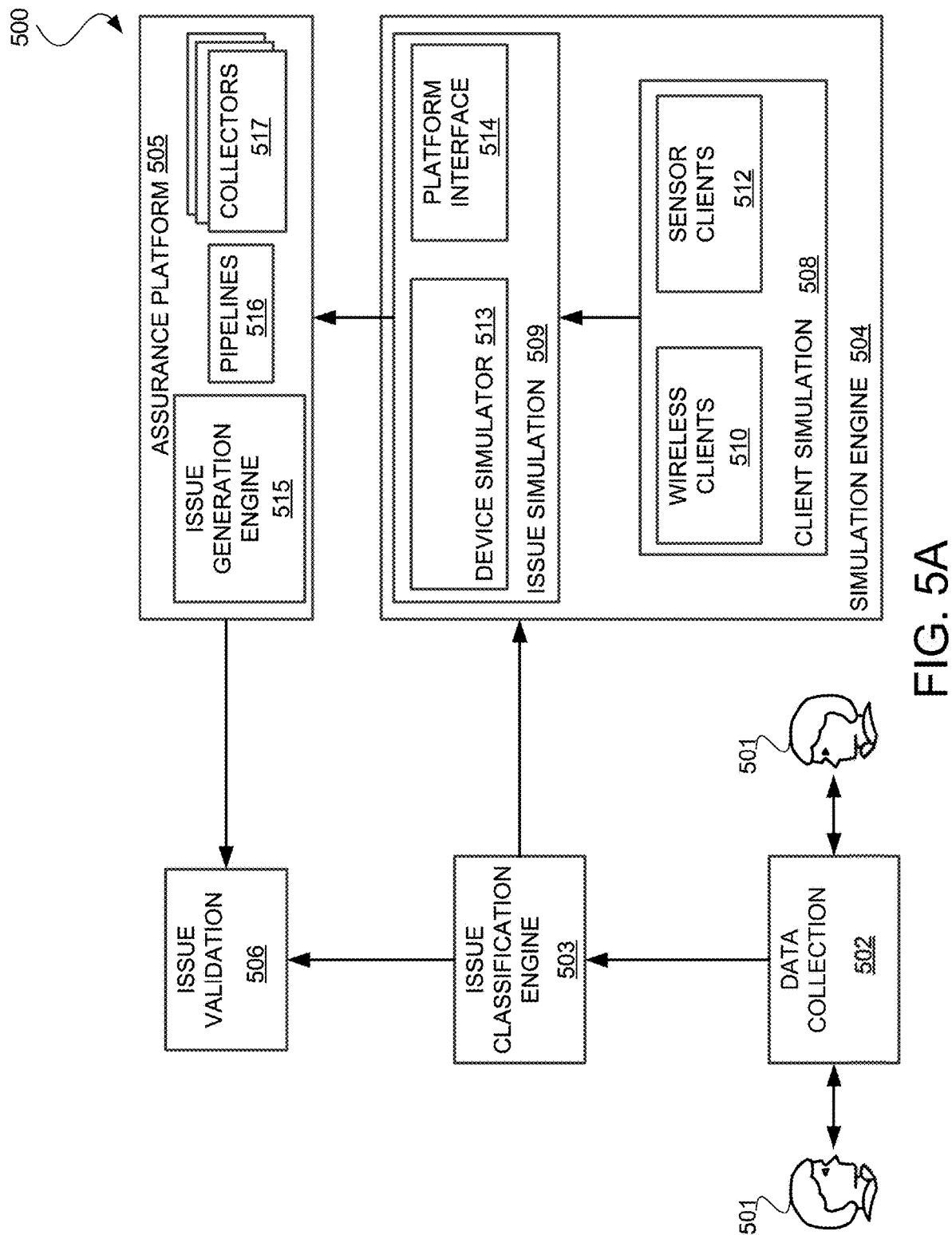
FIG. 5A illustrates an example of an issue validation system for a network management system in accordance with some examples.

FIG. 5A depicts a block diagram of one example of an issue detection and validation system 500. Data can be collected from one or more user clients 501 to generate classifications, simulations, and issue validations by system 500. A data collection process 502 can collect the data from the user clients 501 and provide it to an issue classification engine 503 in a collated and structured format.

Issues classification engine 503 uses the collected data to learn issue classifications (e.g., where a new event sequence or issue is provided), classify issues (e.g., via trained model, etc.), and/or provide event simulation data to a simulation engine 504 for reproducing an issue. In some examples, issue classification engine 503 may include one or more trained models for classifying, clustering, and further processing data. Additionally, issue classification engine 503 may provide an identified issue (e.g., via a classifier, etc.) to an issue validation process 506 for validating issues identified by an assurance platform 505. As a result, issue classification engine 503 may provide an external, to assurance platform 505, source of truth for improving accuracy and robustness of issue identifications.

Simulation engine 504 may include a client simulation process 508 and an issue simulation 509 to replicate event sequences (e.g., those classified by issue classification engine 503) for processing by assurance platform 505 to generate issues (e.g., to send to issue validation process 506). Client simulation process 508 may replicate features, such as operations and configurations, from various client devices, such as APs and WLCs, etc. In particular, client simulation process 508 can include a wireless client simulation process 510 and/or a sensor clients simulation process 512 for replicating features from wireless client devices (e.g., MAC address, IP address, network identifiers, AP SSID, etc.) and client device sensor data (e.g., GPS data, clock information, memory snapshots, etc.) respectively. Issue simulation process 509 may include a device simulator 513 and a platform interface 514. Device simulator 513 can treat (e.g., format according to a standard, derive additional information, etc.) received feature data from client simulation process 508 to provide to assurance platform 505 via platform interface 514. Furthermore, and in some examples, device simulator 513 may provide additional data to assurance platform 505 for a simulated device such as backend or internal (to the network) information to reproduce a particular event sequence.

Assurance platform 505 can receive the simulated data to identify and generate issues (e.g., as discussed in regards to assurance functions 212 above, etc.). Assurance platform 505 can include collectors 517 for retrieving data along the network, pipelines 516 for processing retrieved and received data, and issue generation engine 515 for generating issues reports. Generated issue reports may be sent to issue validation process 506 and issue classifications, provided issue classification engine 503, may be used to validate the received issue reports.

Figure 5B:
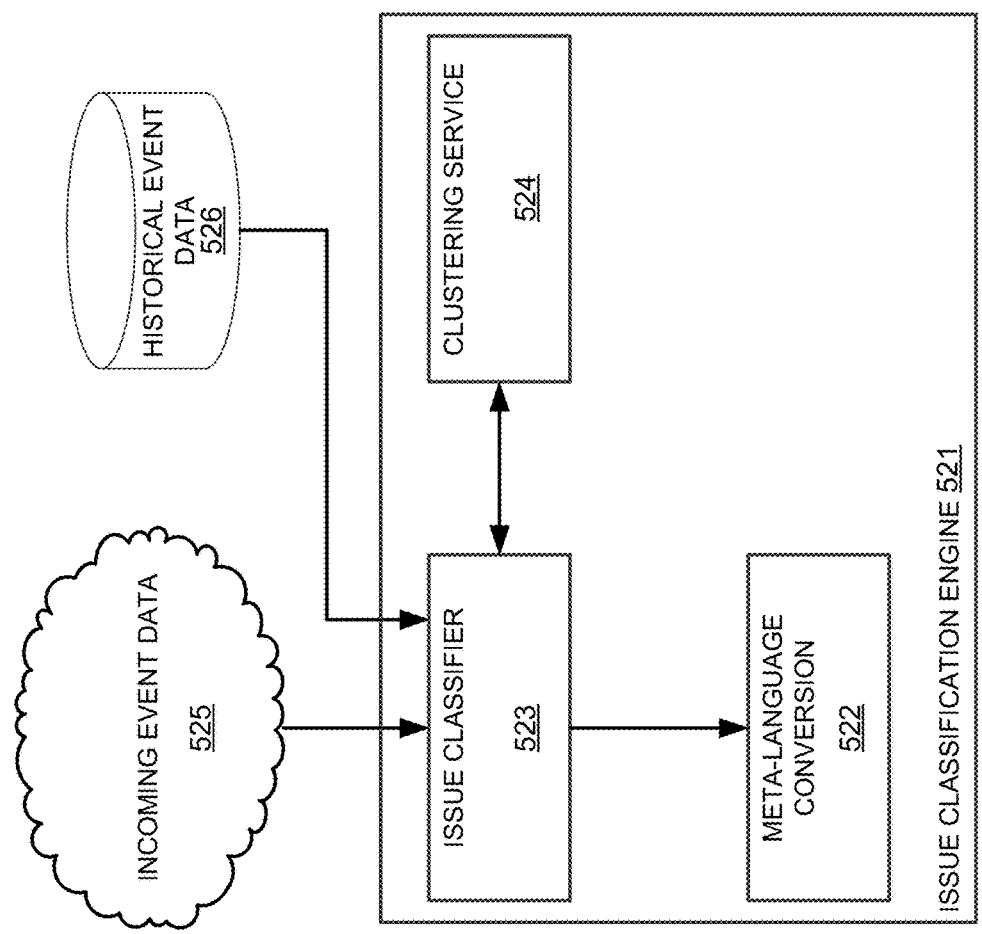
FIG. 5B illustrates an example classification engine for a network management system in according with some examples.

FIG. 5B depicts a block diagram of an example issue classification engine 521. In some examples, issue classification engine 521 may be substantially the same as issue classification engine 503 above. Incoming event data 525 is provided to issue classification engine 521 to classify and/or learn issues. Incoming event data 525 may include various data pulled from across an associated network and/or data related to respective endpoints (e.g., user clients 501, etc.).

Nevertheless, issue classification engine 521 may include an issue classifier 523 for receiving incoming event data 525. In some examples, such as where issue classifier 523 is training an internal model (e.g., a classifier, etc.), a historical event data repository 526 can provide one or more historical datasets to issue classifier 523 for training purposes (e.g., to detect error distances and update the model accordingly, etc.). Further, issue classifier 523 may exchange data with a clustering service 524. Clustering service 524 identifies groupings (e.g., clusters) of classified issues and event sequences. In some examples, clustering service 524 may provide input to issue classifier 523 for training and/or as a feature fed to a model for classifying issues (e.g., based on incoming event data 525, etc.).

Issue classifier 523 provides classified issues to a meta-language conversion process 522. Meta-language conversion process 522 generates a formatted issue classification in a particular meta-language interpretable by downstream process. For example, meta-language conversion process 522 may output an issue classification in the following form: {timestamp, event-type, result-type, reason-code, packet-capture}. In this example, timestamp may include one or more values indicating the time the classified issue occurred, event-type may include information describing the a final event or state related to the classified issue (e.g., timeout type, etc.), reason-code may include reference information for a reason related to the event information included in event-type, and packet-capture may include information related to contents (e.g., origin information, destination information, device information, etc.) of the transmitted packet respective to the classified issue. The generated meta-language issue classification may be provided to downstream processes such as a simulation engine and/or an assurance platform.

FIGS. 5Ci and 5Cii are, respectively, a successful transaction event sequence 530A and a failed transaction event sequence 530B. Successful transaction event sequence 530A and failed transaction event sequence 530B each depict an event sequence which may be processed by, for example, system 500 to produce and validate issue classifications as discussed above. Both sequences 530A-B include a series of paired client-events 531 and reason-code 532 which are depicted here as rows in a chart for explanatory purposes only but which, in some examples, may be 2-tuple data structures and the like. In particular, successful transaction event sequence 531 includes a client-event and reason-code pair 533 indicating a successful device association (e.g., "RUN"). As can be seen, a "NO REASON" reason-code is provided as some client-events, such as successful associations, do not entail a reason-code to explain a successful association. In comparison, failed transaction event sequence 530B includes a client-event and reason-code pair 534 indicating a failed device association (e.g., "AUTH_DONE" and "SPAM_REASSOC_TIMEOUT"). Here, the reason-code indicates that an event related to concluding an authorization attempt occurred due to timeout error (e.g., a response time, such as an authorization message return time, took too long).

Figure 5D:
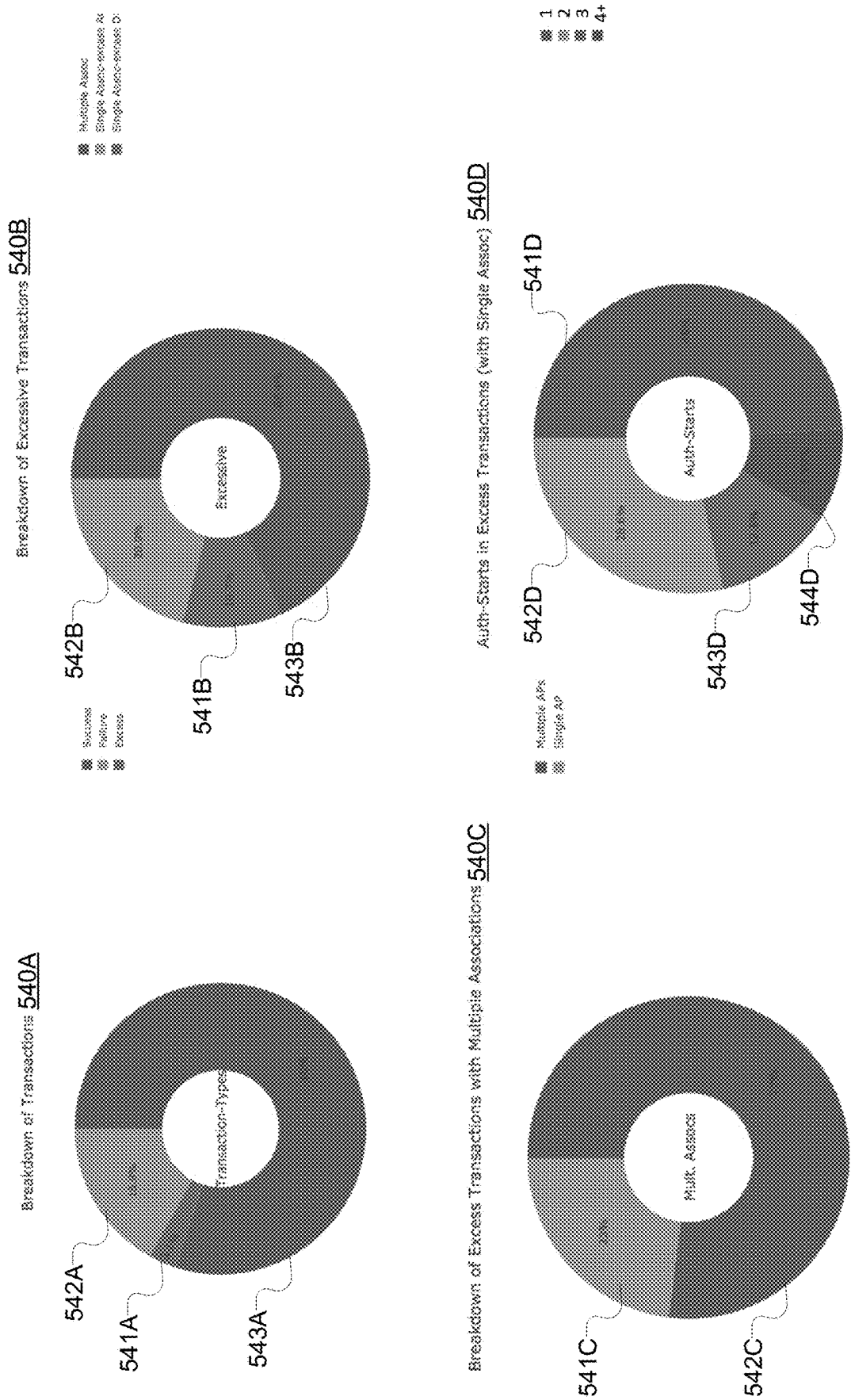
FIG. 5D illustrates transaction event issue analysis graphs in accordance with some examples.

FIG. 5D depicts multiple ring graphs 540A-D displaying transaction analytics. Transactions breakdown ring graph 540A depicts relative proportions of transaction types across some networks. Portion 541A shows 3.1% of transactions are excessive—meaning the transaction successfully complete, however, it took an unacceptably larger amount of time to complete (e.g., without timing out, such as in the case of a transaction failure). For example, where a transaction, such as a device association, takes 10 seconds or longer, the transaction may be identified as an excess transaction. Portion 542A shows 16.9% of transactions are failures (e.g., as discussed in regards to event sequence 530B above) and portion 543A shows 80% of transactions are successes (e.g., as discussed in regards to event sequence 530A above). In effect, issue classification engine 503 may detect the 3.1% excessive transactions of portion 541A using a classifier and/or clustering and without having to handcraft a rules-based issue identifier for use by, for example, assurance platform 505.

Excessive transactions breakdown ring graph 540B depicts relative proportions of excessive breakdowns (e.g., portion 541A) between multiple device association attempts, single association attempts having excess authorization requests, and single association attempts having excess AP access attempts (e.g., device host configuration protocol (DHCP) message transmissions). Portion 541B shows 10.7% of excess transactions include excess AP access attempts, portion 542B shows 20.9% of excess transactions include excess authorization attempts, and portion 543B shows 68.4% of excess transactions include multiple device association attempts. In some examples, multiple association attempts, excess authorization attempts, and/or excess AP access attempts may be represented by a sequence of event codes. In effect, the sequence of event codes can be clustered to find similarities (e.g., groupings) based on subsequences and/or particular events within respective sequences of event codes.

Multiple association excessive transaction breakdown ring graph 540C depicts relative proportions of excessive transactions due to multiple associations (e.g., portion 543B) occurring at a single AP or across multiple APs. In some examples, excess transactions over multiple APs may indicate onboarding occurring concurrently to a device switching radio channels and/or access points (e.g., base stations, wireless routers, etc.). Here, ring portion 541C shows 23% of multiple association excess transactions occur at a single AP and ring portion 542C shows 77% of multiple association excess transactions occur over multiple APs. In effect, excess transaction patterns can be identified by an issue classification engine based on additional information to event sequences (e.g., such as information related to AP, WLC, etc.).

In comparison, excess authentication for single association requests breakdown ring graph 540D depicts relative proportions of excessive transactions due to multiple authentication request events for a single device association request. Ring portion 541D shows that 49% of single association requests resulting in excess authentication events include a single additional excess authentication event. Ring portion 542D shows that 28.6% of single association requests resulting in excess authentication events include two additional excess authentication events. Ring portion 543D shows that 12.8% of single association requests resulting in excess authentication events include three additional excess authentication events. Ring portion 544D shows that 9.59% of single association requests resulting in excess authentication events include four or more excess authentication events. In effect, various patterns, such as repetitions, can be identified by an issue classification engine for identification (e.g., classification) of issues.

Figure 5E:
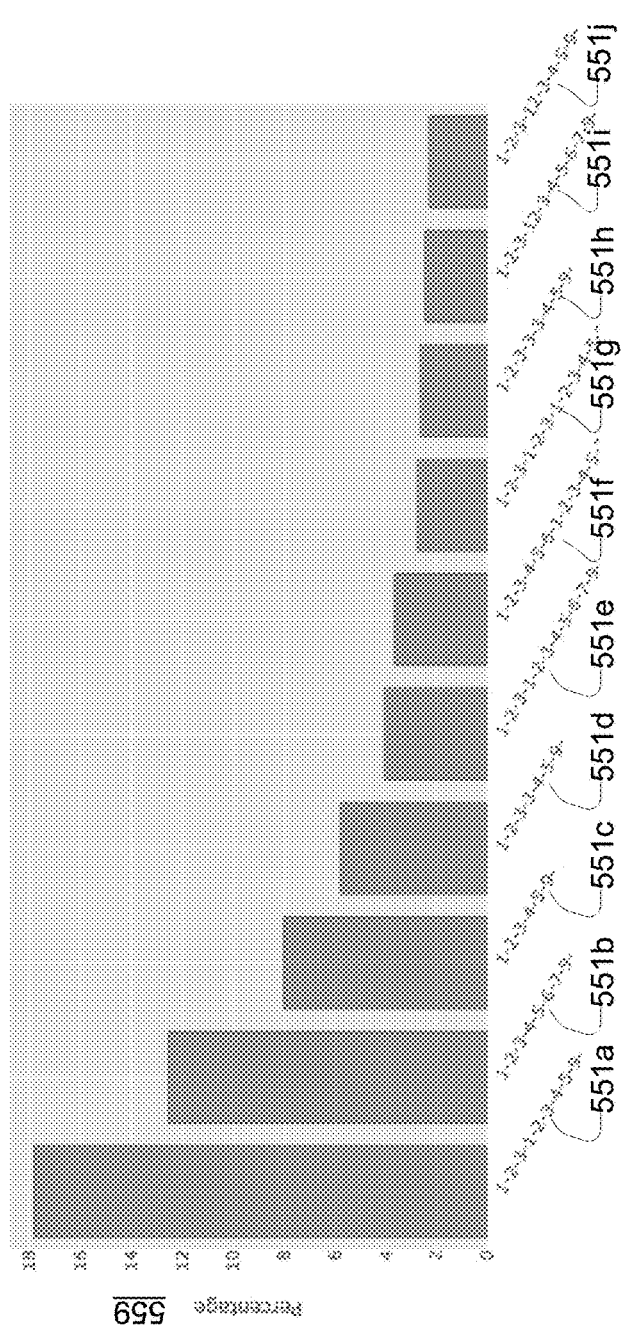
FIG. 5E illustrates a histogram of excess transaction event patterns in accordance with some examples.

FIGS. 5E-F illustrate a selection of particular event sequences which may be associated with excess transactions (e.g., "excess transaction patterns") by an issue classification engine. In particular, FIG. 5E depicts a histogram 550A of an observed 10 most frequent, on one example network and without imputing limitation, excess transaction patterns. FIG. 5F depicts a frequency table 550B of an observed 15 most frequent excess transaction patterns. Excess transaction patterns 551a-o include event codes in a numerical format. As depicted by legend 555, event code numerals may include, for example and without imputing limitation, ASSOC_START ("1"), ASSOC_DONE ("2"), AUTH_START ("3"), AUTH_DONE ("4"), 4 WAY_KEY_DONE ("5"), MOBILITY_DONE ("6"), DHCP_DONE ("7"), RUN ("9"), and EAPOL_START ("12"). Accordingly, each respective excess transaction pattern includes a sequence of events. For example, excess transaction pattern 551a include sequence "1-2-3-1-2-3-4-5-9" which indicates the following event sequence: ASSOC_START, ASSOC_DONE, AUTH_START, ASSOC_START, ASSOC_DONE, AUTHR_START, AUTH_DONE, 4 WAY_KEY_DONE, RUN. In effect, the excess transaction includes two association event sequences (e.g., "ASSOC_START, ASSOC_DONE, AUTH_START"), such as where a device attempts to connect to an AP multiple times before being authorized.

Histogram 550A depicts a bar view of excess transaction patterns against a percentage 559. In comparison, frequency table 550B depicts a tabular view of excess transaction patterns split across a transaction pattern column 556, including event sequences along respective rows, and respectively paired frequency percentages in a frequency column 557.

Figure 5G:
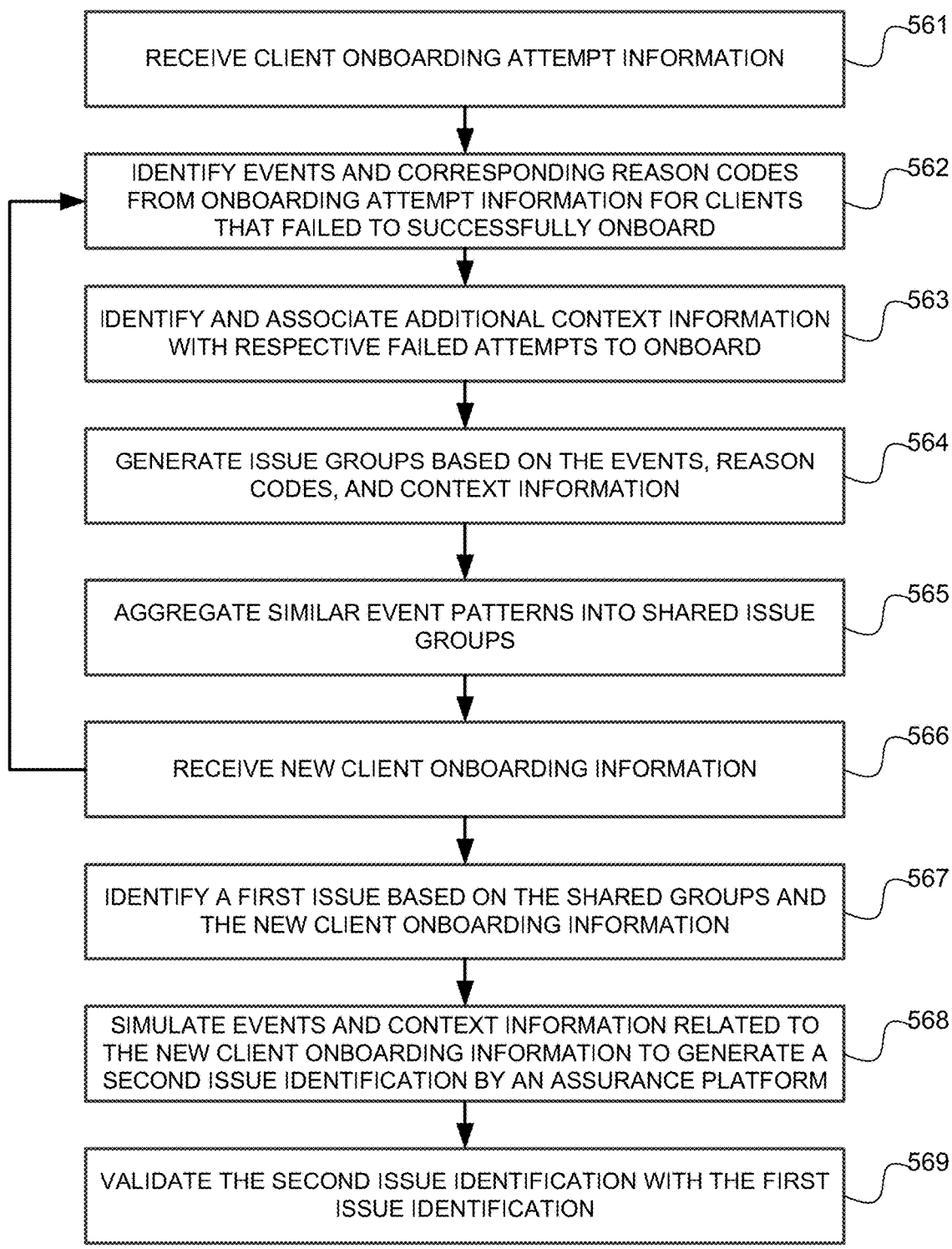
FIG. 5G illustrates a method for identifying and validating issues for a network management system in accordance with some examples.

FIG. 5G depicts a method 560 for validating issues identifications produced by an assurance platform (e.g., assurance platform 505). In some examples, method 560 can be performed by system 500 discussed above.

At step 561, client onboarding attempt information is received. Client onboarding attempt may be real time or may be historical data used to train classifier and/or clustering processes.

At step 562, events and corresponding reason codes are identified from the onboarding attempt information for clients that have failed to successfully onboard. Event and reason codes may be included in client onboarding attempt information. In some examples, an upstream process may package event and reason codes into the information.

At step 563, additional context information for the failed attempts is identified and associated with the respective attempts. Additional context information may include WLC and/or AP information such as IP addresses, SSID information, and the like as well as user client specific information such as location, etc.

At step 564, issue groups are generated based on the events, reason codes, and context information. Issue groups can be generated using a classifier and/or clustering process. The classifier and/or clustering process may identify shared event sequences and context information between reason codes.

At step 565, similar event patterns are aggregated into shared issue groups. Issue groups can be further reduced to shared issue group including partially shared event sequences between issue groups. For example, where a particular event sequence is identified as closely related to a particular reason code, and the particular event sequence occurs across multiple issue groups as a subsequence, the multiple issue groups can be combined into a shared issue group.

At step 566, new client onboarding information is received. In some examples, the new client onboarding information may be provided back into classifier and clustering training steps (e.g., steps 561-565) as well as be processed for downstream issue validation.

At step 567, a first issue is identified based on the shared group and new client onboarding information. The first issue may be identified using a classification engine (e.g., issue classification engine 503). In some examples, the classification engine can include a trained model (e.g., trained via steps 561-565 above) for classifying event sequences as particular issues. Additionally, in some examples, the classification engine can instead or also include a trained model for clustering event sequences and generating issue groups and/or shared issue groups (as discussed above).

At step 568, events and context information are simulated related to the new client onboarding information to generate a second issue identification by an assurance platform. The events and context information can be provided to a simulation engine (e.g., simulation engine 504 discussed above) to reproduce a simulated occurrence substantially similar to an occurrence from which the new client onboarding information was produced.

At step 569, the second issue identification is validated with the first issue identification. In effect, the assurance platform issue identification can be checked against the classification issue identification. In some examples, one or the other may be treated as a source of truth and so, based on which is the source of truth and the validation, issue classification engine can adjust (e.g., update a model parameters to improve issue classification) or the assurance platform may be updated (e.g., rules-based processes may be adjusted) to coincide the second issue identification with the first issue identification.

Figure 6A:
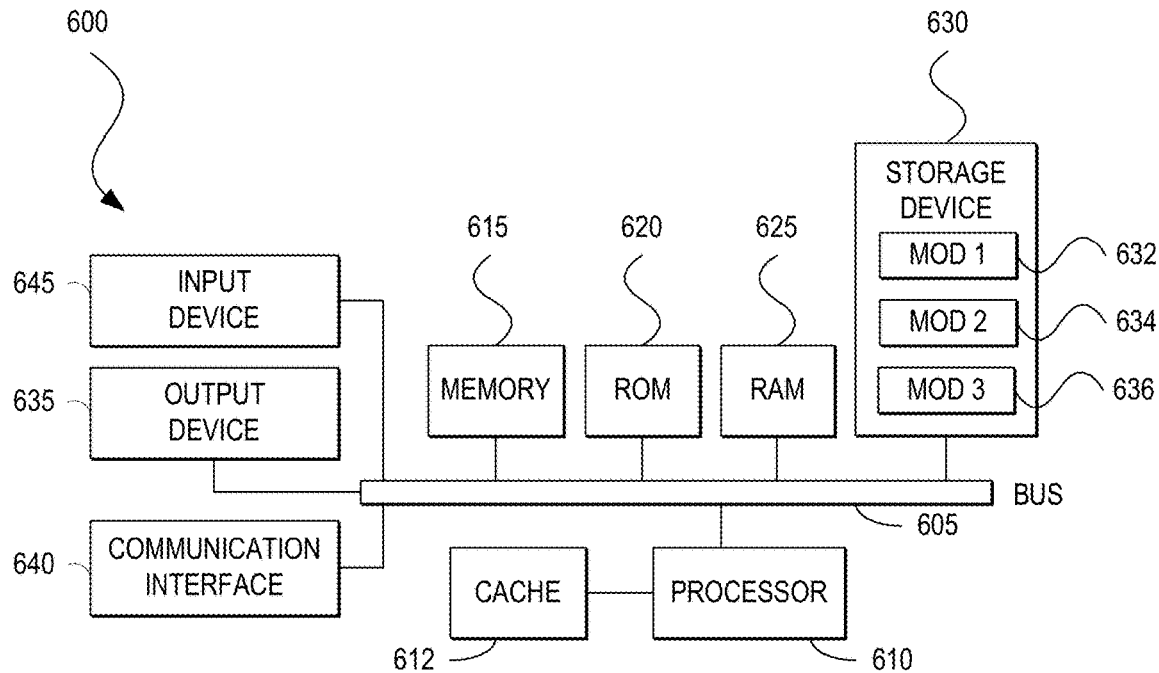
FIGS. 6A and 6B illustrate examples of systems in accordance with some examples.
Figure 6B:
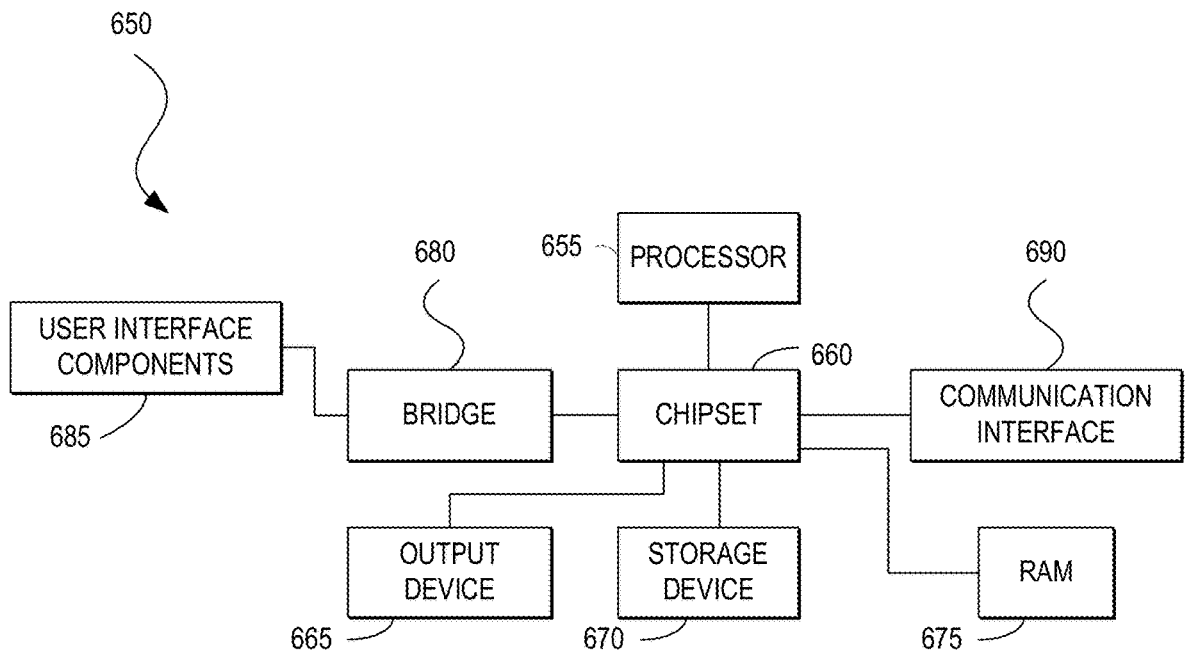

FIG. 6A and FIG. 6B illustrate systems in accordance with various embodiments. The more appropriate system will be apparent to those of ordinary skill in the art when practicing the various embodiments. Persons of ordinary skill in the art will also readily appreciate that other systems are possible.

FIG. 6A illustrates an example of a bus computing system 600 wherein the components of the system are in electrical communication with each other using a bus 605. The computing system 600 can include a processing unit (CPU or processor) 610 and a system bus 605 that may couple various system components including the system memory 615, such as read only memory (ROM) 620 and random access memory (RAM) 625, to the processor 610. The computing system 600 can include a cache 612 of high-speed memory connected directly with, in close proximity to, or integrated as part of the processor 610. The computing system 600 can copy data from the memory 615, ROM 620, RAM 625, and/or storage device 630 to the cache 612 for quick access by the processor 610. In this way, the cache 612 can provide a performance boost that avoids processor delays while waiting for data. These and other modules can control the processor 610 to perform various actions. Other system memory 615 may be available for use as well. The memory 615 can include multiple different types of memory with different performance characteristics. The processor 610 can include any general purpose processor and a hardware module or software module, such as module 1 632, module 2 634, and module 3 636 stored in the storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing system 600, an input device 645 can represent any number of input mechanisms, such as a microphone for speech, a touch-protected screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing system 600. The communications interface 640 can govern and manage the user input and system output. There may be no restriction on operating on any particular hardware arrangement and therefore the basic features here may easily be substituted for improved hardware or firmware arrangements as they are developed.

The storage device 630 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 630 can include the software modules 632, 634, 636 for controlling the processor 610. Other hardware or software modules are contemplated. The storage device 630 can be connected to the system bus 605. In some embodiments, a hardware module that performs a particular function can include a software component stored in a computer-readable medium in connection with the necessary hardware components, such as the processor 610, bus 605, output device 635, and so forth, to carry out the function.

FIG. 6B illustrates an example architecture for a chipset computing system 650 that can be used in accordance with an embodiment. The computing system 650 can include a processor 655, representative of any number of physically and/or logically distinct resources capable of executing software, firmware, and hardware configured to perform identified computations. The processor 655 can communicate with a chipset 660 that can control input to and output from the processor 655. In this example, the chipset 660 can output information to an output device 665, such as a display, and can read and write information to storage device 670, which can include magnetic media, solid state media, and other suitable storage media. The chipset 660 can also read data from and write data to RAM 675. A bridge 680 for interfacing with a variety of user interface components 685 can be provided for interfacing with the chipset 660. The user interface components 685 can include a keyboard, a microphone, touch detection and processing circuitry, a pointing device, such as a mouse, and so on. Inputs to the computing system 650 can come from any of a variety of sources, machine generated and/or human generated.

The chipset 660 can also interface with one or more communication interfaces 690 that can have different physical interfaces. The communication interfaces 690 can include interfaces for wired and wireless LANs, for broadband wireless networks, as well as personal area networks. Some applications of the methods for generating, displaying, and using the technology disclosed herein can include receiving ordered datasets over the physical interface or be generated by the machine itself by the processor 655 analyzing data stored in the storage device 670 or the RAM 675. Further, the computing system 650 can receive inputs from a user via the user interface components 685 and execute appropriate functions, such as browsing functions by interpreting these inputs using the processor 655.

It will be appreciated that computing systems 600 and 650 can have more than one processor 610 and 655, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Examples are provided herein to enhance understanding of the disclosure. A specific set of statements are provided as follows:

Statement 1: A computer-implemented method includes receiving network traffic data, identifying event sequences within the network traffic data, generating definition groups by performing clustering on the identified event sequences, the definition groups including event sequence characteristics associated with one or more network issues, providing one or more of the event sequences to an issue simulation engine to simulate the one or more of the event sequences and generating a first issue identification by an assurance platform, generating a second issue identification based on the definition groups and the one or more of the event sequences, and validating the first issue identification with the second issue identification.

Statement 2: A method according to Statement 1 includes the issue simulation engine including a client simulation for simulating a portion of the provided one or more of the event sequences from a client device perspective.

Statement 3: A method according to any of the preceding Statements includes the definition groups associated with onboarding failures.

Statement 4: A method according to Statement 3 includes the onboarding failures including an excess onboarding transaction.

Statement 5: A method according to any of the preceding Statements includes the network traffic data being generated by network devices including one of a wireless local area network controller (WLC) or an access point (AP).

Statement 6: A method according to any of the preceding Statements includes the network traffic data including a data model including one of a wireless client state, client statistics, AP radio frequency (RF) statistics, an over air packet capture, a network services key performance indicator (KPI), or a device health KPI.

Statement 7: A method according to any of the preceding Statements includes generating the first issue identification including applying, by the assurance platform, a rules-based issue identification process to the simulated event sequences.

Statement 8: A system includes one or more processors, and a memory storing instructions to receive network traffic data, identify event sequences within the network traffic data, generate definition groups by performing clustering on the identified event sequences, the definition groups including event sequence characteristics associated with one or more network issues, provide one or more of the event sequences to an issue simulation engine to simulate the one or more of the event sequences and generating a first issue identification by an assurance platform, generate a second issue identification based on the definition groups and the one or more of the event sequences, and validate the first issue identification with the second issue identification.

Statement 9: A non-transitory computer readable medium stores instructions that, when executed by one or more processors, cause the one or more processors to receive network traffic data, identify event sequences within the network traffic data, generate definition groups by performing clustering on the identified event sequences, the definition groups including event sequence characteristics associated with one or more network issues, provide one or more of the event sequences to an issue simulation engine to simulate the one or more of the event sequences and generating a first issue identification by an assurance platform, generate a second issue identification based on the definition groups and the one or more of the event sequences, and validate the first issue identification with the second issue identification.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method comprising:
   identifying event sequences within network traffic data;
   filtering out a subset of the event sequences based on characteristics of the subset of the event sequences;
   generating definition groups by performing clustering on the subset of the event sequences, the definition groups comprising event sequence characteristics associated with one or more network issues;
   first simulating the subset of the event sequences;
   generating, based on results of the first simulating, a first issue identification;
   second simulating a most recent one of the identified event sequences;
   generating, based on results of the second simulating and the generated definition groups, a second issue identification; and
   validating the first issue identification with the second issue identification.

2. The method of claim 1, wherein the issue simulation engine includes a client simulation for simulating a portion of the event sequences from a client device perspective.

3. The method of claim 1, wherein the definition groups are associated with onboarding failures.

4. The method of claim 3, wherein the onboarding failures comprise an excess onboarding transaction.

5. The method of claim 1, wherein the network traffic data is generated by network devices comprising one of a wireless local area network controller (WLC) or an access point (AP).

6. The method of claim 1, wherein the network traffic data comprises a data model including one of a wireless client state, client statistics, AP radio frequency (RF) statistics, an over air packet capture, a network services key performance indicator (KPI), or a device health KPI.

7. The method of claim 1, further comprising generating a first issue identification by applying a rules-based issue identification process to the simulated event sequences.

8. A non-transitory media storing instructions that when executed by a processor of a system cause the system to perform operations comprising:
   identify event sequences within network traffic data;
   filter out a subset of the event sequences based on characteristics of the subset of the event sequences;
   generate definition groups by performing clustering on the subset of the event sequences, the definition groups comprising event sequence characteristics associated with one or more network issues;
   first simulate the subset of the event sequences
   generate, based on results of the first simulating, a first issue identification;
   second simulate a most recent one of the identified event sequences;
   generate, based on results of the second simulating and the generated definition groups, a second issue identification; and
   validate the first issue identification with the second issue identification.

9. The non-transitory media of claim 8, wherein the issue simulation engine includes a client simulation for simulating a portion of the event sequences from a client device perspective.

10. The non-transitory media of claim 8, wherein the definition groups are associated with onboarding failures.

11. The non-transitory media of claim 10, wherein the onboarding failures comprise an excess onboarding transaction.

12. The non-transitory media of claim 8, wherein the network traffic data is generated by network devices comprising one of a wireless local area network controller (WLC) or an access point (AP).

13. The non-transitory media of claim 8, wherein the network traffic data comprises a data model including one of a wireless client state, client statistics, AP radio frequency (RF) statistics, an over air packet capture, a network services key performance indicator (KPI), or a device health KPI.

14. The non-transitory media of claim 8, the operations further comprising generate a first issue identification by applying a rules-based issue identification process to the simulated event sequences.

15. A system, comprising:
   a processor:
   a non-transitory media storing instructions that when executed by a processor of a system cause the system to perform operations comprising:
      identify event sequences within network traffic data;
      filter out a subset of the event sequences;
      generate definition groups by performing clustering on the subset of the event sequences, the definition groups comprising event sequence characteristics associated with one or more network issues;
      first simulate the subset of the event sequences
      generate, based on results of the first simulating, a first issue identification;
      second simulate a most recent one of the identified event sequences;
      generate, based on results of the second simulating and the generated definition groups, a second issue identification; and validate the first issue identification with the second issue identification.

16. The system of claim 15, wherein the issue simulation engine includes a client simulation for simulating a portion of the event sequences from a client device perspective.

17. The system of claim 15, wherein the definition groups are associated with onboarding failures.

18. System of claim 17, wherein the onboarding failures comprise an excess onboarding transaction.

19. The system of claim 15, wherein the network traffic data is generated by network devices comprising one of a wireless local area network controller (WLC) or an access point (AP).

20. The system of claim 15, wherein the network traffic data comprises a data model including one of a wireless client state, client statistics, AP radio frequency (RF) statistics, an over air packet capture, a network services key performance indicator (KPI), or a device health KPI.

* * * * *